(12) United States Patent
Ganti et al.

(10) Patent No.: US 8,174,752 B2
(45) Date of Patent: *May 8, 2012

(54) INTERFEROMETRIC MODULATOR IN TRANSMISSION MODE

(75) Inventors: Surya Ganti, Los Altos, CA (US); Kasra Khazeni, San Jose, CA (US); Jeff Sampsell, Pueblo West, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/087,184

(22) Filed: Apr. 14, 2011

(65) Prior Publication Data

US 2011/0194169 A1 Aug. 11, 2011

Related U.S. Application Data

(63) Continuation of application No. 12/368,915, filed on Feb. 10, 2009, now Pat. No. 7,944,604.

(60) Provisional application No. 61/034,917, filed on Mar. 7, 2008.

(51) Int. Cl.
*G02B 26/00* (2006.01)

(52) U.S. Cl. .......................... 359/291; 359/290

(58) Field of Classification Search .......... 359/290–298, 359/318
See application file for complete search history.

(56) References Cited

U.S. PATENT DOCUMENTS

| | | | |
|---|---|---|---|
| 2,590,906 A | 4/1952 | Tripp | |
| 2,677,714 A | 5/1954 | Auwarter | |
| 3,247,392 A | 4/1966 | Thelen | |
| 3,679,313 A | 7/1972 | Rosenberg | |
| 3,728,030 A | 4/1973 | Hawes | |
| 3,886,310 A | 5/1975 | Guldberg | |
| 3,955,190 A | 5/1976 | Teraishi | |
| 4,403,248 A | 9/1983 | te Velde | |
| 4,421,381 A | 12/1983 | Ueda et al. | |
| 4,441,789 A | 4/1984 | Pohlack | |
| 4,441,791 A | 4/1984 | Hornbeck | |

(Continued)

FOREIGN PATENT DOCUMENTS

DE   10 2006 039 071   2/2008

(Continued)

OTHER PUBLICATIONS

Brosnihan et al., Jun. 2003, Optical IMEMS—a fabrication process for MEMS optical switches with integrated on-chip electronic, Transducers, Solid-State Sensors, Actuators and Microsystems, 12$^{th}$ International Conference 2003, 2(8-12):1638-1642.

(Continued)

*Primary Examiner* — Mohammed Hasan
(74) *Attorney, Agent, or Firm* — Knobbe, Martens, Olson & Bear LLP

(57) ABSTRACT

A transmissive micromechanical device includes a substrate, an optical stack over the substrate and a moveable membrane over the optical stack. The moveable membrane may include a partially reflective mirror and be configured to move from a first position to a second position. When the movable membrane is in the first position the transmissive micromechanical device is configured to pass light of a predetermined color and when the movable membrane is in the second position, the micromechanical device is configured to block substantially all of light incident on the substrate.

28 Claims, 21 Drawing Sheets

U.S. PATENT DOCUMENTS

| | | | |
|---|---|---|---|
| 4,497,974 A | 2/1985 | Deckman et al. | |
| 4,498,953 A | 2/1985 | Cook et al. | |
| 4,560,435 A | 12/1985 | Brown et al. | |
| 4,655,554 A | 4/1987 | Armitage | |
| 4,705,361 A | 11/1987 | Frazier et al. | |
| 4,779,959 A | 10/1988 | Saunders | |
| 4,786,128 A | 11/1988 | Birnbach | |
| 4,822,993 A | 4/1989 | Dillon et al. | |
| 4,859,060 A | 8/1989 | Katagiri et al. | |
| 4,925,259 A | 5/1990 | Emmett | |
| 4,954,789 A | 9/1990 | Sampsell | |
| 4,956,619 A | 9/1990 | Hornbeck | |
| 4,973,131 A | 11/1990 | Carnes | |
| 4,982,184 A | 1/1991 | Kirkwood | |
| 5,022,745 A | 6/1991 | Zayhowski et al. | |
| 5,028,939 A | 7/1991 | Hornbeck et al. | |
| 5,062,689 A | 11/1991 | Koehler | |
| 5,091,983 A | 2/1992 | Lukosz | |
| 5,096,279 A | 3/1992 | Hornbeck et al. | |
| 5,170,283 A | 12/1992 | O'Brien et al. | |
| 5,315,370 A | 5/1994 | Bulow | |
| 5,381,232 A | 1/1995 | Van Wijk | |
| 5,416,514 A | 5/1995 | Janssen et al. | |
| 5,452,138 A | 9/1995 | Mignardi et al. | |
| 5,471,341 A | 11/1995 | Warde et al. | |
| 5,526,172 A | 6/1996 | Kanack | |
| 5,550,373 A | 8/1996 | Cole et al. | |
| 5,559,358 A | 9/1996 | Burns et al. | |
| 5,561,523 A | 10/1996 | Blomberg et al. | |
| 5,597,736 A | 1/1997 | Sampsell | |
| 5,600,383 A | 2/1997 | Hornbeck | |
| 5,636,052 A | 6/1997 | Arney et al. | |
| 5,646,729 A | 7/1997 | Koskinen et al. | |
| 5,646,768 A | 7/1997 | Kaeriyama | |
| 5,661,592 A | 8/1997 | Bornstein et al. | |
| 5,665,997 A | 9/1997 | Weaver et al. | |
| 5,699,181 A | 12/1997 | Choi | |
| 5,710,656 A | 1/1998 | Goosen | |
| 5,719,068 A | 2/1998 | Suzawa et al. | |
| 5,734,177 A | 3/1998 | Sakamoto | |
| 5,771,116 A | 6/1998 | Miller et al. | |
| 5,786,927 A | 7/1998 | Greywall et al. | |
| 5,808,781 A | 9/1998 | Arney et al. | |
| 5,818,095 A | 10/1998 | Sampsell | |
| 5,825,528 A | 10/1998 | Goosen | |
| 5,835,255 A * | 11/1998 | Miles | 359/291 |
| 5,838,484 A | 11/1998 | Goossen et al. | |
| 5,867,302 A | 2/1999 | Fleming | |
| 5,870,221 A | 2/1999 | Goossen | |
| 5,914,804 A | 6/1999 | Goossen | |
| 5,920,418 A | 7/1999 | Shiono et al. | |
| 5,961,848 A | 10/1999 | Jacquet et al. | |
| 6,028,689 A | 2/2000 | Michalicek et al. | |
| 6,031,653 A | 2/2000 | Wang | |
| 6,040,937 A | 3/2000 | Miles | |
| 6,046,659 A | 4/2000 | Loo et al. | |
| 6,055,090 A | 4/2000 | Miles | |
| 6,100,861 A | 8/2000 | Cohen et al. | |
| 6,124,851 A | 9/2000 | Jacobsen | |
| 6,242,932 B1 | 6/2001 | Hembree | |
| 6,262,697 B1 | 7/2001 | Stephenson | |
| 6,301,000 B1 | 10/2001 | Johnson | |
| 6,323,987 B1 | 11/2001 | Rinaudo et al. | |
| 6,327,071 B1 | 12/2001 | Kimura | |
| 6,335,235 B1 | 1/2002 | Bhekta et al. | |
| 6,351,329 B1 | 2/2002 | Greywall | |
| 6,356,378 B1 | 3/2002 | Huibers | |
| 6,377,233 B2 | 4/2002 | Colgan et al. | |
| 6,381,022 B1 | 4/2002 | Zavracky | |
| 6,384,952 B1 | 5/2002 | Clark et al. | |
| 6,400,738 B1 | 6/2002 | Tucker et al. | |
| 6,433,917 B1 | 8/2002 | Mei et al. | |
| 6,437,583 B1 | 8/2002 | Tartagni et al. | |
| 6,438,282 B1 | 8/2002 | Takeda et al. | |
| 6,452,712 B2 | 9/2002 | Atobe et al. | |
| 6,466,354 B1 | 10/2002 | Gudeman | |
| 6,519,073 B1 | 2/2003 | Goossen | |
| 6,556,338 B2 | 4/2003 | Han et al. | |
| 6,574,033 B1 | 6/2003 | Chui et al. | |
| 6,597,490 B2 | 7/2003 | Tayebati | |
| 6,608,268 B1 | 8/2003 | Goldsmith | |
| 6,632,698 B2 | 10/2003 | Ives | |
| 6,650,455 B2 | 11/2003 | Miles | |
| 6,657,832 B2 | 12/2003 | Williams et al. | |
| 6,661,561 B2 | 12/2003 | Fitzpatrick et al. | |
| 6,674,562 B1 | 1/2004 | Miles et al. | |
| 6,680,792 B2 | 1/2004 | Miles | |
| 6,698,295 B1 | 3/2004 | Sherrer | |
| 6,710,908 B2 | 3/2004 | Miles et al. | |
| 6,738,194 B1 | 5/2004 | Ramirez et al. | |
| 6,768,555 B2 | 7/2004 | Chen et al. | |
| 6,794,119 B2 | 9/2004 | Miles | |
| 6,813,059 B2 | 11/2004 | Hunter et al. | |
| 6,836,366 B1 | 12/2004 | Flanders et al. | |
| 6,841,081 B2 | 1/2005 | Chang et al. | |
| 6,844,959 B2 | 1/2005 | Huibers et al. | |
| 6,849,471 B2 | 2/2005 | Patel et al. | |
| 6,862,127 B1 | 3/2005 | Ishii | |
| 6,867,896 B2 | 3/2005 | Miles | |
| 6,870,581 B2 | 3/2005 | Li et al. | |
| 6,870,654 B2 | 3/2005 | Lin et al. | |
| 6,882,458 B2 | 4/2005 | Lin et al. | |
| 6,882,461 B1 | 4/2005 | Tsai et al. | |
| 6,912,022 B2 | 6/2005 | Lin et al. | |
| 6,913,942 B2 | 7/2005 | Patel et al. | |
| 6,940,630 B2 | 9/2005 | Xie | |
| 6,947,200 B2 | 9/2005 | Huibers | |
| 6,952,303 B2 | 10/2005 | Lin et al. | |
| 6,958,847 B2 | 10/2005 | Lin | |
| 6,960,305 B2 | 11/2005 | Doan et al. | |
| 6,980,350 B2 | 12/2005 | Hung et al. | |
| 6,982,820 B2 | 1/2006 | Tsai | |
| 7,002,726 B2 | 2/2006 | Patel et al. | |
| 7,006,272 B2 | 2/2006 | Tsai | |
| 7,009,754 B2 | 3/2006 | Huibers | |
| 7,027,204 B2 | 4/2006 | Trisnadi et al. | |
| 7,034,981 B2 | 4/2006 | Makigaki | |
| 7,046,422 B2 | 5/2006 | Kimura et al. | |
| 7,072,093 B2 | 7/2006 | Piehl et al. | |
| 7,113,339 B2 | 9/2006 | Taguchi et al. | |
| 7,119,945 B2 | 10/2006 | Kothari et al. | |
| 7,123,216 B1 | 10/2006 | Miles | |
| 7,126,738 B2 | 10/2006 | Miles | |
| 7,130,104 B2 | 10/2006 | Cummings | |
| 7,184,195 B2 | 2/2007 | Yang | |
| 7,184,202 B2 | 2/2007 | Miles et al. | |
| 7,198,973 B2 | 4/2007 | Lin et al. | |
| 7,221,495 B2 | 5/2007 | Miles et al. | |
| 7,236,284 B2 | 6/2007 | Miles | |
| 7,245,285 B2 | 7/2007 | Yeh et al. | |
| 7,289,259 B2 | 10/2007 | Chui et al. | |
| 7,302,157 B2 | 11/2007 | Chui | |
| 7,321,456 B2 | 1/2008 | Cummings | |
| 7,321,457 B2 | 1/2008 | Heald | |
| 7,327,510 B2 | 2/2008 | Cummings et al. | |
| 7,372,613 B2 | 5/2008 | Chui et al. | |
| 7,372,619 B2 | 5/2008 | Miles | |
| 7,385,744 B2 | 6/2008 | Kogut et al. | |
| 7,385,762 B2 | 6/2008 | Cummings | |
| 7,400,488 B2 | 7/2008 | Lynch et al. | |
| 7,405,852 B2 | 7/2008 | Brosnihan et al. | |
| 7,417,746 B2 | 8/2008 | Lin et al. | |
| 7,420,725 B2 | 9/2008 | Kothari | |
| 7,436,573 B2 | 10/2008 | Doan et al. | |
| 7,459,402 B2 | 12/2008 | Doan et al. | |
| 7,460,291 B2 | 12/2008 | Sampsell et al. | |
| 7,460,292 B2 | 12/2008 | Chou | |
| 7,471,444 B2 | 12/2008 | Miles | |
| 7,476,327 B2 | 1/2009 | Tung et al. | |
| 7,477,440 B1 | 1/2009 | Huang et al. | |
| 7,492,503 B2 | 2/2009 | Chui | |
| 7,508,566 B2 | 3/2009 | Feenstra et al. | |
| 7,515,327 B2 | 4/2009 | Cummings | |
| 7,527,995 B2 | 5/2009 | Sampsell | |
| 7,532,377 B2 | 5/2009 | Miles | |
| 7,532,381 B2 | 5/2009 | Miles | |
| 7,535,621 B2 | 5/2009 | Chiang | |

| | | |
|---|---|---|
| 7,542,198 B2 | 6/2009 | Kothari |
| 7,550,794 B2 | 6/2009 | Miles et al. |
| 7,550,810 B2 | 6/2009 | Mignard et al. |
| 7,554,711 B2 | 6/2009 | Miles |
| 7,554,714 B2 | 6/2009 | Chui et al. |
| 7,561,321 B2 | 7/2009 | Heald |
| 7,564,612 B2 | 7/2009 | Chui |
| 7,566,664 B2 | 7/2009 | Yan et al. |
| 7,567,373 B2 | 7/2009 | Chui et al. |
| 7,569,488 B2 | 8/2009 | Rafanan |
| 7,612,933 B2 | 11/2009 | Djordjev |
| 7,629,197 B2 | 12/2009 | Luo et al. |
| 7,782,523 B2 | 8/2010 | Ishii |
| 7,813,029 B2 | 10/2010 | Kothari et al. |
| 7,848,003 B2 | 12/2010 | Kothari et al. |
| 7,852,544 B2 | 12/2010 | Sampsell |
| 7,855,826 B2 | 12/2010 | de Groot |
| 7,898,722 B2 | 3/2011 | Miles |
| 7,944,604 B2 * | 5/2011 | Ganti et al. .................. 359/291 |
| 2001/0003487 A1 | 6/2001 | Miles |
| 2001/0028503 A1 | 10/2001 | Flanders et al. |
| 2001/0043171 A1 | 11/2001 | Van Gorkom et al. |
| 2002/0054424 A1 | 5/2002 | Miles |
| 2002/0070931 A1 | 6/2002 | Ishikawa |
| 2002/0075555 A1 | 6/2002 | Miles |
| 2002/0126364 A1 | 9/2002 | Miles |
| 2002/0146200 A1 | 10/2002 | Kurdle et al. |
| 2002/0149828 A1 | 10/2002 | Miles |
| 2002/0149834 A1 | 10/2002 | Mei et al. |
| 2002/0154422 A1 | 10/2002 | Sniegowski et al. |
| 2002/0197761 A1 | 12/2002 | Patel et al. |
| 2003/0011864 A1 | 1/2003 | Flanders |
| 2003/0016428 A1 | 1/2003 | Kato et al. |
| 2003/0035196 A1 | 2/2003 | Walker |
| 2003/0043157 A1 | 3/2003 | Miles |
| 2003/0053078 A1 | 3/2003 | Missey et al. |
| 2003/0081178 A1 | 5/2003 | Shimizu et al. |
| 2003/0119221 A1 | 6/2003 | Cunningham et al. |
| 2003/0123125 A1 | 7/2003 | Little |
| 2003/0138669 A1 | 7/2003 | Kojima et al. |
| 2003/0173504 A1 | 9/2003 | Cole et al. |
| 2003/0202265 A1 | 10/2003 | Reboa et al. |
| 2003/0202266 A1 | 10/2003 | Ring et al. |
| 2004/0008396 A1 | 1/2004 | Stappaerts |
| 2004/0008438 A1 | 1/2004 | Sato |
| 2004/0027671 A1 | 2/2004 | Wu et al. |
| 2004/0027701 A1 | 2/2004 | Ishikawa |
| 2004/0043552 A1 | 3/2004 | Strumpell et al. |
| 2004/0058532 A1 | 3/2004 | Miles et al. |
| 2004/0066477 A1 | 4/2004 | Morimoto et al. |
| 2004/0075967 A1 | 4/2004 | Lynch et al. |
| 2004/0076802 A1 | 4/2004 | Tompkin et al. |
| 2004/0080035 A1 | 4/2004 | Delapierre |
| 2004/0100594 A1 | 5/2004 | Huibers et al. |
| 2004/0100677 A1 | 5/2004 | Huibers et al. |
| 2004/0125281 A1 | 7/2004 | Lin et al. |
| 2004/0125282 A1 | 7/2004 | Lin et al. |
| 2004/0145811 A1 | 7/2004 | Lin et al. |
| 2004/0147198 A1 | 7/2004 | Lin et al. |
| 2004/0175577 A1 | 9/2004 | Lin et al. |
| 2004/0184134 A1 | 9/2004 | Makigaki |
| 2004/0188599 A1 | 9/2004 | Viktorovitch et al. |
| 2004/0207897 A1 | 10/2004 | Lin |
| 2004/0209195 A1 | 10/2004 | Lin |
| 2004/0217919 A1 | 11/2004 | Pichi et al. |
| 2004/0218251 A1 | 11/2004 | Piehl et al. |
| 2004/0240032 A1 | 12/2004 | Miles |
| 2004/0259010 A1 | 12/2004 | Kanbe |
| 2005/0002082 A1 | 1/2005 | Miles |
| 2005/0003667 A1 | 1/2005 | Lin et al. |
| 2005/0024557 A1 | 2/2005 | Lin |
| 2005/0035699 A1 | 2/2005 | Tsai |
| 2005/0036095 A1 | 2/2005 | Yeh et al. |
| 2005/0046919 A1 | 3/2005 | Taguchi et al. |
| 2005/0046922 A1 | 3/2005 | Lin et al. |
| 2005/0046948 A1 | 3/2005 | Lin |
| 2005/0068627 A1 | 3/2005 | Nakamura et al. |
| 2005/0078348 A1 | 4/2005 | Lin |
| 2005/0117190 A1 | 6/2005 | Iwauchi et al. |
| 2005/0117623 A1 | 6/2005 | Shchukin et al. |
| 2005/0128543 A1 | 6/2005 | Phillips et al. |
| 2005/0133761 A1 | 6/2005 | Thielemans |
| 2005/0157265 A1 | 7/2005 | Florence et al. |
| 2005/0168849 A1 | 8/2005 | Lin |
| 2005/0179378 A1 | 8/2005 | Oooka et al. |
| 2005/0195462 A1 | 9/2005 | Lin |
| 2005/0275930 A1 | 12/2005 | Patel et al. |
| 2006/0007517 A1 | 1/2006 | Tsai |
| 2006/0017379 A1 | 1/2006 | Su et al. |
| 2006/0017689 A1 | 1/2006 | Faase et al. |
| 2006/0024880 A1 | 2/2006 | Chui et al. |
| 2006/0038643 A1 | 2/2006 | Xu et al. |
| 2006/0065940 A1 | 3/2006 | Kothari |
| 2006/0066599 A1 | 3/2006 | Chui |
| 2006/0066640 A1 | 3/2006 | Kothari et al. |
| 2006/0066641 A1 | 3/2006 | Gally et al. |
| 2006/0066936 A1 | 3/2006 | Chui et al. |
| 2006/0067649 A1 | 3/2006 | Tung et al. |
| 2006/0077155 A1 | 4/2006 | Chui et al. |
| 2006/0077156 A1 | 4/2006 | Chui et al. |
| 2006/0082588 A1 | 4/2006 | Mizuno et al. |
| 2006/0082863 A1 | 4/2006 | Piehl et al. |
| 2006/0132927 A1 | 6/2006 | Yoon |
| 2006/0180886 A1 | 8/2006 | Tsang |
| 2006/0220160 A1 | 10/2006 | Miles |
| 2006/0262126 A1 | 11/2006 | Miles |
| 2007/0020948 A1 | 1/2007 | Piehl et al. |
| 2007/0077525 A1 | 4/2007 | Davis et al. |
| 2007/0086078 A1 | 4/2007 | Hagood et al. |
| 2007/0097694 A1 | 5/2007 | Faase et al. |
| 2007/0121118 A1 | 5/2007 | Gally et al. |
| 2007/0138608 A1 | 6/2007 | Ikehashi |
| 2007/0153860 A1 | 7/2007 | Chang-Hasnain et al. |
| 2007/0177247 A1 | 8/2007 | Miles |
| 2007/0216987 A1 | 9/2007 | Hagood et al. |
| 2007/0253054 A1 | 11/2007 | Miles |
| 2007/0279729 A1 | 12/2007 | Kothari et al. |
| 2007/0279730 A1 | 12/2007 | Heald |
| 2007/0285761 A1 | 12/2007 | Zhong et al. |
| 2008/0002299 A1 | 1/2008 | Thurn |
| 2008/0013144 A1 | 1/2008 | Chui et al. |
| 2008/0013145 A1 | 1/2008 | Chui et al. |
| 2008/0030657 A1 | 2/2008 | Wu et al. |
| 2008/0037093 A1 | 2/2008 | Miles |
| 2008/0055706 A1 | 3/2008 | Chui et al. |
| 2008/0055707 A1 | 3/2008 | Kogut et al. |
| 2008/0068697 A1 | 3/2008 | Haluzak et al. |
| 2008/0080043 A1 | 4/2008 | Chui et al. |
| 2008/0088904 A1 | 4/2008 | Miles |
| 2008/0088910 A1 | 4/2008 | Miles |
| 2008/0088911 A1 | 4/2008 | Miles |
| 2008/0088912 A1 | 4/2008 | Miles |
| 2008/0094690 A1 | 4/2008 | Luo et al. |
| 2008/0106782 A1 | 5/2008 | Miles |
| 2008/0110855 A1 | 5/2008 | Cummings |
| 2008/0112035 A1 | 5/2008 | Cummings |
| 2008/0158645 A1 | 7/2008 | Chiang |
| 2008/0186581 A1 | 8/2008 | Bita et al. |
| 2008/0239455 A1 | 10/2008 | Kogut et al. |
| 2008/0247028 A1 | 10/2008 | Chui et al. |
| 2008/0278787 A1 | 11/2008 | Sasagawa |
| 2008/0278788 A1 | 11/2008 | Sasagawa |
| 2008/0297880 A1 | 12/2008 | Steckl et al. |
| 2008/0316566 A1 | 12/2008 | Lan |
| 2008/0316568 A1 | 12/2008 | Griffiths et al. |
| 2009/0009845 A1 | 1/2009 | Endisch et al. |
| 2009/0021884 A1 | 1/2009 | Nakamura |
| 2009/0068781 A1 | 3/2009 | Tung et al. |
| 2009/0073534 A1 | 3/2009 | Lee et al. |
| 2009/0073539 A1 | 3/2009 | Mignard |
| 2009/0078316 A1 | 3/2009 | Khazeni |
| 2009/0080060 A1 | 3/2009 | Sampsell et al. |
| 2009/0101192 A1 | 4/2009 | Kothari |
| 2009/0103166 A1 | 4/2009 | Khazeni et al. |
| 2009/0122384 A1 | 5/2009 | Felnhofer et al. |
| 2009/0135465 A1 | 5/2009 | Chui |
| 2009/0147343 A1 | 6/2009 | Kogut et al. |
| 2009/0159123 A1 | 6/2009 | Kothari |

| | | | |
|---|---|---|---|
| 2009/0201566 A1 | 8/2009 | Kothari | |
| 2009/0211885 A1 | 8/2009 | Steeneken et al. | |
| 2009/0213450 A1 | 8/2009 | Sampsell | |
| 2009/0213451 A1 | 8/2009 | Tung et al. | |
| 2009/0231666 A1 | 9/2009 | Gudlavalletti et al. | |
| 2009/0251761 A1 | 10/2009 | Khazeni et al. | |
| 2009/0256218 A1 | 10/2009 | Mignard et al. | |
| 2009/0257105 A1 | 10/2009 | Xu et al. | |
| 2009/0273823 A1 | 11/2009 | Tung et al. | |
| 2009/0273824 A1 | 11/2009 | Sasagawa | |
| 2009/0279162 A1 | 11/2009 | Chui | |
| 2009/0293955 A1 | 12/2009 | Kothari et al. | |
| 2010/0039370 A1 | 2/2010 | Miles | |
| 2010/0080890 A1 | 4/2010 | Tung et al. | |
| 2010/0085626 A1 | 4/2010 | Tung et al. | |
| 2010/0118382 A1 | 5/2010 | Kothari et al. | |
| 2010/0236624 A1 | 9/2010 | Khazeni et al. | |
| 2010/0309572 A1 | 12/2010 | Mignard | |
| 2011/0019380 A1 | 1/2011 | Miles | |
| 2011/0026095 A1 | 2/2011 | Kothari et al. | |
| 2011/0026096 A1 | 2/2011 | Miles | |
| 2011/0038027 A1 | 2/2011 | Miles | |
| 2011/0044496 A1 | 2/2011 | Chui et al. | |
| 2011/0069371 A1 | 3/2011 | Kothari et al. | |
| 2011/0080632 A1 | 4/2011 | Miles | |
| 2011/0116156 A1 | 5/2011 | Kothari | |
| 2011/0134505 A1 | 6/2011 | Sasagawa | |
| 2011/0170166 A1 | 7/2011 | Miles | |
| 2011/0170167 A1 | 7/2011 | Miles | |
| 2011/0170168 A1 | 7/2011 | Endisch et al. | |
| 2011/0188109 A1 | 8/2011 | Chui et al. | |
| 2011/0188110 A1 | 8/2011 | Miles | |

FOREIGN PATENT DOCUMENTS

| | | |
|---|---|---|
| EP | 0 035 299 | 9/1983 |
| EP | 0 668 490 | 8/1995 |
| EP | 0 695 959 | 2/1996 |
| EP | 0 879 991 | 11/1998 |
| EP | 0 969 306 | 1/2000 |
| EP | 0 986 077 | 3/2000 |
| EP | 1 122 577 | 8/2001 |
| EP | 1 205 782 | 5/2002 |
| EP | 1 227 346 | 7/2002 |
| EP | 1 275 997 | 1/2003 |
| EP | 1 403 212 | 3/2004 |
| EP | 1 473 581 | 11/2004 |
| EP | 1 802 114 | 6/2007 |
| EP | 1 847 864 | 10/2007 |
| EP | 1 928 028 | 6/2008 |
| JP | 56-088111 | 7/1981 |
| JP | 5-49238 | 2/1993 |
| JP | 5-281479 | 10/1993 |
| JP | 08-051230 | 2/1996 |
| JP | 11211999 | 8/1999 |
| JP | 2002-062490 | 2/2000 |
| JP | 2000 147262 | 5/2000 |
| JP | 2001-221913 | 8/2001 |
| JP | 2001 249283 | 9/2001 |
| JP | 2002-221678 | 8/2002 |
| JP | 2003-340795 | 2/2003 |
| JP | 2003 177336 | 6/2003 |
| JP | 2004-012642 | 1/2004 |
| JP | 2004-212638 | 7/2004 |
| JP | 2004-212680 | 7/2004 |
| JP | 2005 279831 | 10/2005 |
| JP | 2005-308871 | 11/2005 |
| JP | 2007 027150 | 2/2007 |
| WO | WO 98/14804 | 4/1998 |
| WO | WO 98/43129 | 10/1998 |
| WO | WO 01/53113 | 7/2001 |
| WO | WO 02/24570 | 3/2002 |
| WO | WO 02/086582 | 10/2002 |
| WO | WO 03/105198 | 12/2003 |
| WO | WO 2006/035698 | 4/2006 |
| WO | WO 2007/036422 | 4/2007 |
| WO | WO 2007/045875 | 4/2007 |
| WO | WO 2007/053438 | 5/2007 |
| WO | WO 2007/072998 | 6/2007 |
| WO | WO 2008/062363 | 5/2008 |

OTHER PUBLICATIONS

Cacharelis et al., 1997, A Reflebtive-mode PDLC Light Valve Display Technology, Proceedings of European Solid State Device Research Conference (ESSDERC), pp. 596-599.

Dokmeci et al., Dec. 2004, Two-axis single-crystal silicon micromirror arrays, Journal of Microelectromechanical Systems, 13(6):1006-1017.

Maier et al., 1996, 1.3" active matrix liquid crystal spatial light modulator with 508 dpi resolution, SPIE vol. 2754, pp. 171-179.

ColorLink, 2006, Optical Assemblies, Product Overview, 2 pp.

ColorLink, 2003, ColorQuade® . . . A brighter future for projection, Product Description, 2 pp.

IPRP dated Feb. 17, 2010 in PCT/US09/035737.

Londergan et al., Advanced processes for MEMS-based displays, Proceedings of the Asia Display 2007, SID, 1:107-112.

Nakagawa et al., Feb. 1, 2002, Wide-field-of-view narrow-band spectral filters based on photonic crystal nanocavities, Optics Letters, 27(3):191-193.

Conner, "Hybrid Color Display Using Optical Interference Filter Array," SID Digest, pp. 577-580 (1993).

Feenstra et al., Electrowetting displays, Liquivista BV, 16 pp., Jan. 2006.

Jerman et al., "A Miniature Fabry-Perot Interferometer with a Corrugated Silicon Diaphragm Support", (1988).

Jerman et al., "Miniature Fabry-Perot Interferometers Micromachined in Silicon for Use in Optical Fiber WDM Systems," Transducers, San Francisco, Jun. 24-27, 1991, Proceedings on the Int'l. Conf. on Solid State Sensors and Actuators, vol. CONF. 6, Jun. 24, 1991, pp. 372-375.

Kowarz et al., Conformal grating electromechanical system (GEMS) for high-speed digital light modulation, Proceedings of the IEEE 15th. Annual International Conference on Micro Electro Mechanical Systems, MEMS 2002, pp. 568-573.

Lezec, Submicrometer dimple array based interference color field displays and sensors, Nano Lett. 7(2):329-333, Dec. 23, 2006.

Longhurst, 1963, Chapter IX: Multiple Beam Interferometry, in Geometrical and Physical Optics, pp. 153-157.

Miles, A New Reflective FPD Technology Using Interferometric Modulation, Journal of the SID, 5/4, 1997.

Miles, Interferometric modulation: MOEMS as an enabling technology for high performance reflective displays, Proceedings of SPIE, vol. 4985, pp. 131-139, 2003.

Pape et al., Characteristics of the deformable mirror device for optical information processing, Optical Engineering, 22(6):676-681, Nov.-Dec. 1983.

Taii et al., "A transparent sheet display by plastic MEMS," Journal of the SID 14(8):735-741, 2006.

Tolansky, 1948, Chapter II: Multiple-Beam Interference, in Multiple-bean Interferometry of Surfaces and Films, Oxford at the Clarendon Press, pp. 8-11.

ISR and WO dated Jul. 17, 2009 in PCT/US09/035737.

Billard, Tunable Capacitor, 5th Annual Review of LETI, Jun. 24, 2003, p. 7.

Hohlfeld et al., Jun. 2003, Micro-machined tunable optical filters with optimized band-pass spectrum, 12th International Conference on Transducers, Solid-State Sensors, Actuators and Microsystems, 2:1494-1497.

Mehregany et al., 1996, MEMS applications in optical systems, IEEE/LEOS 1996 Summer Topical Meetings, pp. 75-76.

Miles et al, Oct. 21, 1997, A MEMS based interferometric modulator (IMOD) for display applications, Proceedings of Sensors Expo, pp. 281-284.

Nieminen et al., 2004, Design of a temperature-stable RF MEM capacitor, IEEE Journal of Microelectromechanical Systems, 13(5):705-714.

Wang, Jun. 29-Jul. 1, 2002, Design and fabrication of a novel two-dimension MEMS-based tunable capacitor, IEEE 2002 International Conference on Communications, Circuits and Systems and West Sino Expositions, 2:1766-1769.

\* cited by examiner

|  | +V$_{bias}$ | -V$_{bias}$ |
|---|---|---|
| 0 | Stable | Stable |
| +ΔV | Relax | Actuate |
| -ΔV | Actuate | Relax |

Column Output Signals (columns); Row Output Signals (rows)

INTERFEROMETRIC MODULATOR IN TRANSMISSION MODE

CROSS-REFERENCE TO RELATED APPLICATIONS

This application is a continuation of U.S. application Ser. No. 12/368,915, filed Feb. 10, 2009, now U.S. Pat. No. 7,944,604 which claims priority to U.S. Provisional Application Ser. No. 61/034,917, filed Mar. 7, 2008, the contents of each of which is hereby incorporated by reference in its entirety.

BACKGROUND

1. Field of the Invention

The field of the invention relates to microelectromechanical systems ("MEMS").

2. Description of the Related Art

Microelectromechanical systems (MEMS) include micro mechanical elements, actuators, and electronics. Micromechanical elements may be created using deposition, etching, and/or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may include a pair of conductive plates, one or both of which may be transparent and/or reflective in whole or part and capable of relative motion upon application of an appropriate electrical signal. In a particular embodiment, one plate may include a stationary layer deposited on a substrate and the other plate may include a movable membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF CERTAIN INVENTIVE ASPECTS

In one aspect a transmissive micromechanical device includes a substrate, an optical stack over the substrate and a moveable membrane over the optical stack, wherein the moveable membrane includes a partially reflective mirror, and wherein the movable membrane is configured to move from a first position to a second position so that wherein when the movable membrane is in the first position the transmissive micromechanical device is configured to pass light of a predetermined color and wherein when the movable membrane is in the second position, the micromechanical device is configured to block substantially all of light incident on the substrate.

In another aspect a transmissive mechanical device includes a first optical stack and a second optical stack selectably separated by a gap, wherein the first optical stack includes a substantially transparent substrate, at least one low refractive index layer and at least one high refractive index layer and wherein the second optical stack includes a substantially transparent substrate, at least one low refractive index layer and at least one high refractive index layer.

In another aspect a transmissive mechanical device includes a first optical stack and a second optical stack separated by a gap, wherein the first optical stack includes a glass substrate, at least one material with an index of refraction greater than 2 and at least one material with an index of refraction less than 1.3 and wherein the second optical stack includes at least one material with an index of refraction greater than 2 and at least one material with an index of refraction less than 1.3.

In another aspect a transmissive interferometric modulator includes a transparent substrate, a first reflecting surface on the transparent substrate and a second reflecting surface disposed on a movable membrane such that the second reflecting surface and the first reflecting surface form a variable optical cavity.

In another aspect a transmissive interferometric modulator ("IMOD") includes a transparent substrate, a first reflecting surface disposed on the transparent substrate, a second reflecting surface on a movable membrane such that the second reflecting surface and the first reflecting surface form a variable optical cavity, wherein the interferometric modulator is configured to pass light of a predetermined color with the first reflecting surface disposed in a first position, and a semiconductor layer configured to absorb substantially all visible light incident on the substrate with the first reflecting surface disposed in a second position.

DETAILED DESCRIPTION OF CERTAIN EMBODIMENTS

The following detailed description is directed to certain specific embodiments, however, the teachings herein can be applied in a multitude of different ways. In this description, reference is made to the drawings wherein like parts are designated with like numerals throughout. As will be apparent from the following description, the embodiments may be implemented in any device that is configured to display an image, whether in motion (for example, video) or stationary (for example, still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (for example, odometer display, etc.), cockpit controls and/or displays, display of camera views (for example, display of a rear view camera in a vehicle), electronic photographs, electronic billboards or signs, projectors, architectural structures, packaging, and aesthetic structures (for example, display of images on a piece of jewelry). MEMS devices of similar structure to those described herein can also be used in non-display applications such as in electronic switching devices.

Certain embodiments as will be described below provide a transmissive backlit interferometric modulator display. In one embodiment, the backlit display includes a backlight and an array of transmissive interferometric modulators (IMODs). Each interferometric modulator includes a fixed optical stack and a movable optical stack. In a relaxed state the interferometric modulators cause light within the desire wavelength range to be transmitted while reflecting at least a portion of the remaining light. In an actuated state the interferometric modulators cause substantially all light within the desired wavelength range to be absorbed (for example, with a contrast ratio between the transmission state and the absorbing state of at least 10:1 in some embodiments). Such transmissive IMODs may utilize certain aspects of reflective IMODs that are described with respect to FIGS. 1-7.

Figure 1:
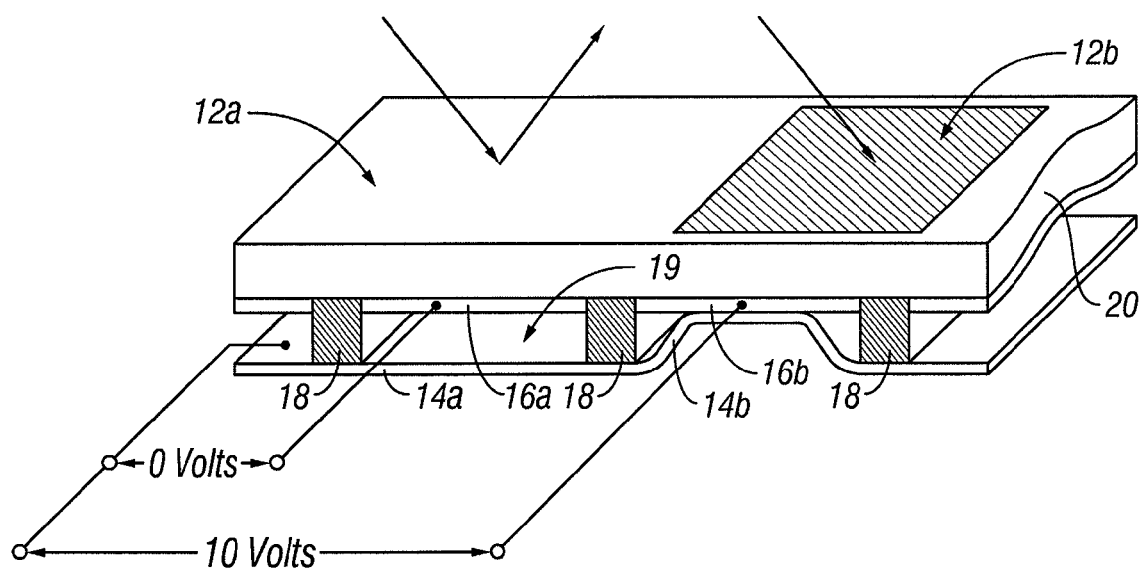
FIG. 1 is an isometric view depicting a portion of an exemplary interferometric modulator display in which a movable reflective layer of a first interferometric modulator is in a relaxed position and a movable reflective layer of a second interferometric modulator is in an actuated position.

One reflective interferometric modulator (IMOD) display comprising interferometric MEMS display elements is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel includes a MEMS interferometric modulator. In some embodiments, an interferometric modulator display includes a row/column array of interferometric modulators, where two such IMODs are of the type depicted in FIG. 1. Each interferometric modulator includes at least a pair of reflective layers (or stacks of layers) positioned at a variable and controllable distance from each other to form a resonant optical gap with at least one variable dimension. For example, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective fixed layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent reflective interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, may include several fused layers, which can include an electrode layer and one or more optical layers, such as indium tin oxide (ITO), a partially reflective layer, such as chromium (an absorber), and a transparent dielectric. The optical stack 16 is thus electrically conductive and may be fabricated, for example, by depositing one or more of the above layers onto a transparent substrate 20. The partially reflective layers can be formed from a variety of materials that are partially reflective such as various metals, semiconductors, and dielectrics. The partially reflective layer can be formed of one or more layers of materials, and each of the layers can be formed of a single material or a combination of materials.

The layers of the optical stack 16 may be patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
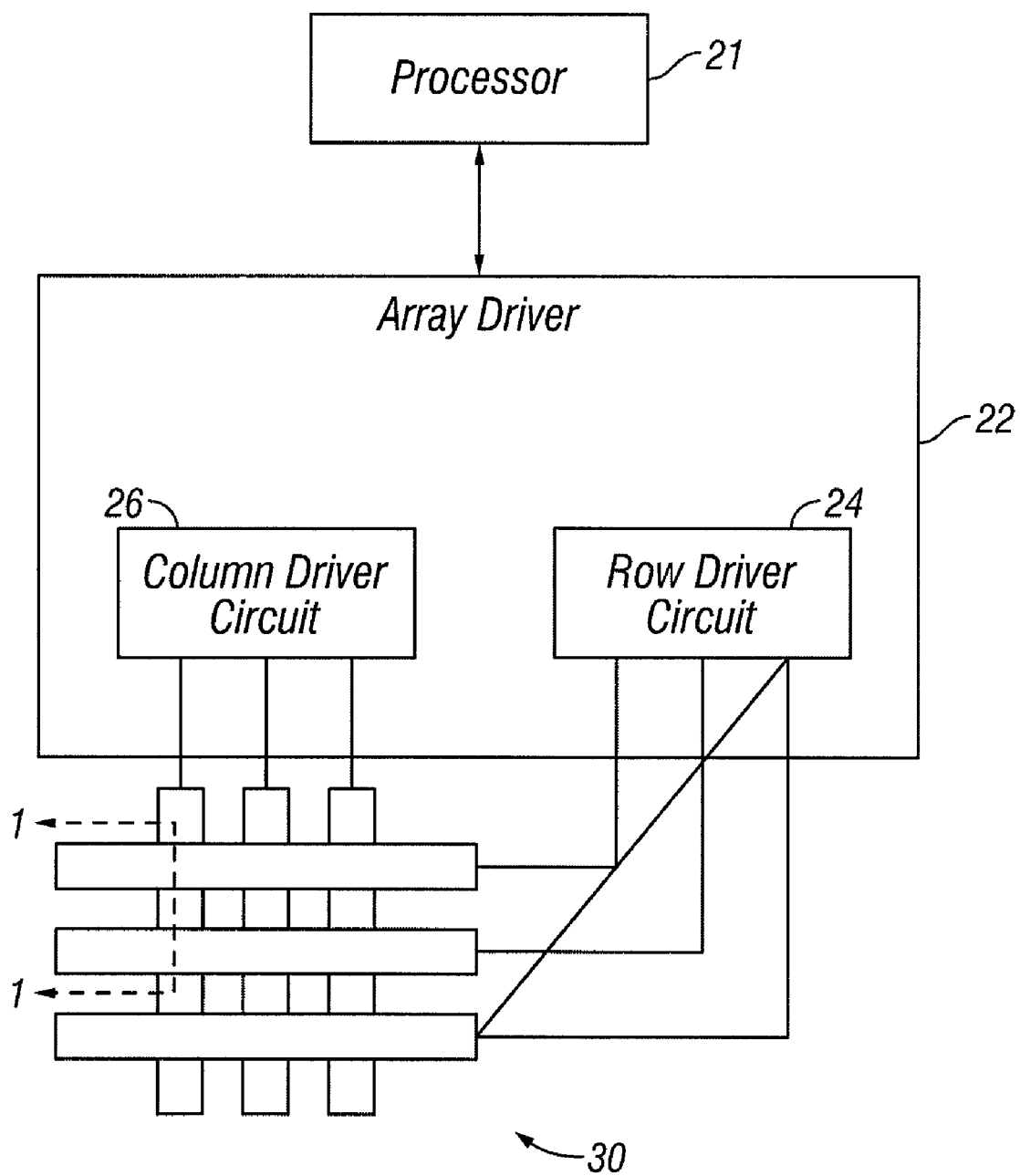
FIG. 2 is a system block diagram illustrating an exemplary electronic device incorporating a 3×3 interferometric modulator display.

FIG. 2 is a system block diagram illustrating one example of an electronic device that may incorporate aspects of the teachings herein. The electronic device may include a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

Figures 3, 4:
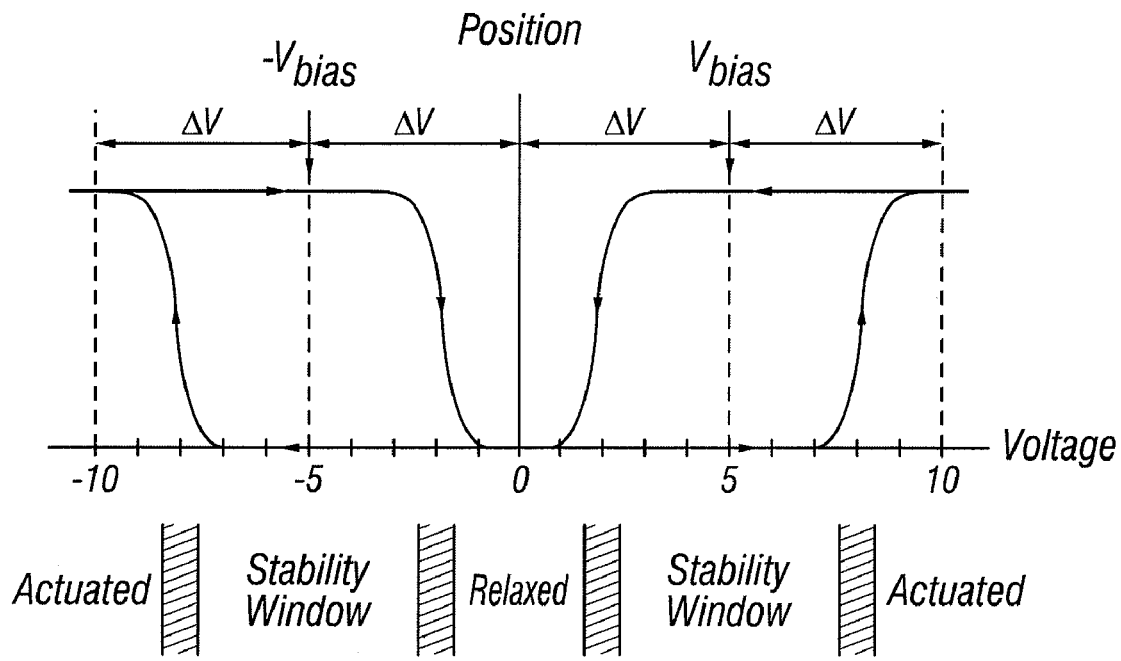
FIG. 3 is a diagram of movable mirror position versus applied voltage for one exemplary implementation of an interferometric modulator of FIG. 1.
FIG. 4 is an illustration of a set of row and column voltages that may be used to drive an interferometric modulator display.

In one example, the processor 21 is also configured to communicate with an array driver 22. The array driver 22 may include a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may include, for example, a 10 volt potential difference to cause a movable layer to deform from the relaxed state to the actuated state. However, when the voltage is reduced from that value, the movable layer maintains its state as the voltage drops back below 10 volts. In FIG. 3, the movable layer does not relax completely until the voltage drops below 2 volts. Thus, there exists a window of applied voltage, about 3 to 7 V in the example illustrated in FIG. 3, within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, can be considered as a capacitor formed by the fixed and moving reflective layers, this stable state can be held at a voltage within the hysteresis window with almost no power dissipation. No (or very little) current flows into the pixel if the applied potential is fixed.

In some applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figure 5A:
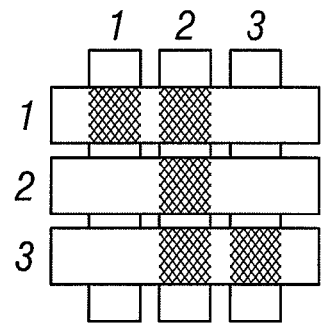
FIG. 5A illustrates one exemplary frame of display data in the 3×3 interferometric modulator display of FIG. 2.
Figure 5B:
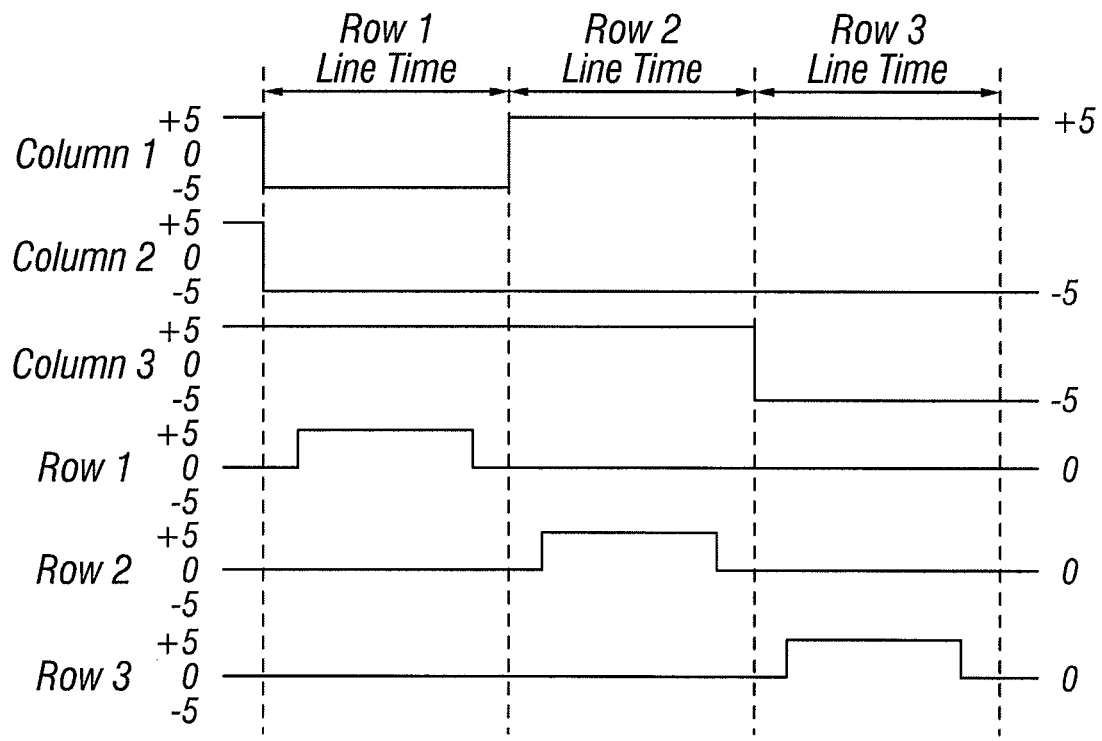
FIG. 5B illustrates one exemplary timing diagram for row and column signals that may be used to write the frame of FIG. 5A.

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In FIG. 4, actuating a pixel involves setting the appropriate column to $-V_{bias}$, and the appropriate row to $+\Delta V$, which may correspond to −5 volts and +5 volts, respectively. Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, voltages of opposite polarity than those described above can be used, for example, actuating a pixel can involve setting the appropriate column to $+V_{bias}$, and the appropriate row to $-\Delta V$. In this example, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. The same procedure can be employed for arrays of dozens or hundreds of rows and columns. The timing, sequence, and levels of voltages used to perform row and column actuation can be varied widely within the general principles outlined above, and the above example is exemplary only, and any actuation voltage method can be used with the systems and methods described herein.

Figure 6A:
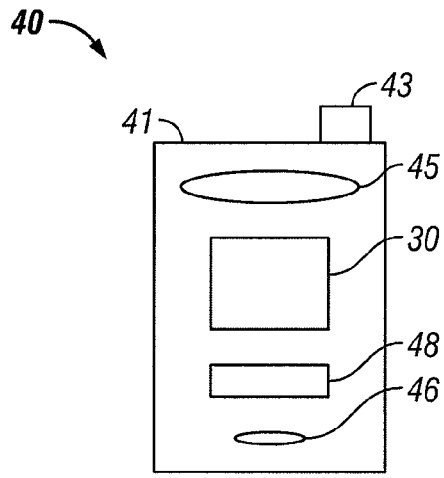
FIGS. 6A and 6B are system block diagrams illustrating an exemplary visual display device comprising a plurality of interferometric modulators.
Figure 6B:
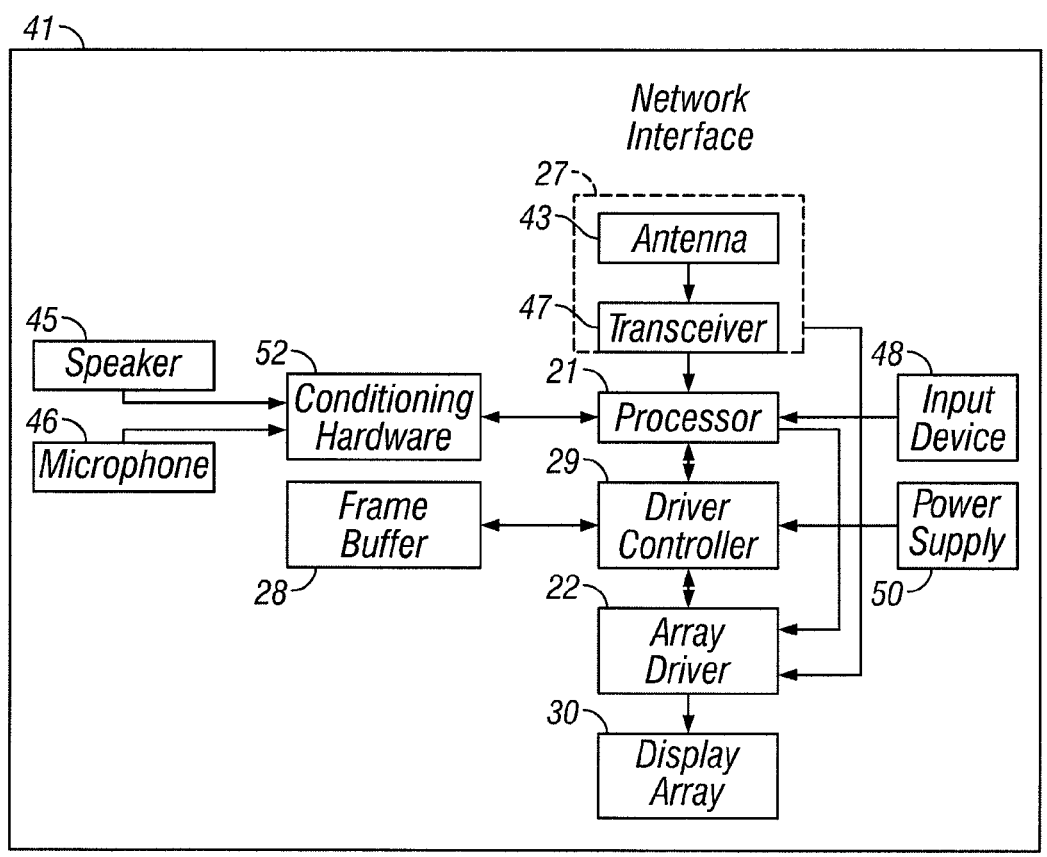

FIGS. 6A and 6B are system block diagrams illustrating an exemplary display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes, including injection molding and vacuum forming. In addition, the housing 41 may be made from any of a variety of materials, including, but not limited to, plastic, metal, glass, rubber, and ceramic, or a combination thereof. In one embodiment, the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device. However, for purposes of description, the display 30 includes an interferometric modulator display, as described herein.

The components of exemplary display device 40 are schematically illustrated in FIG. 6B. The illustrated exemplary display device 40 includes a housing 41 and can include additional components at least partially enclosed therein. For example, the exemplary display device 40 includes a network interface 27 that includes an antenna 43, which is coupled to a transceiver 47. The transceiver 47 is connected to a processor 21, which is connected to conditioning hardware 52. The conditioning hardware 52 may be configured to condition a signal (for example, filter a signal). The conditioning hardware 52 is connected to a speaker 45 and a microphone 46. The processor 21 is also connected to an input device 48 and a driver controller 29. The driver controller 29 is coupled to a frame buffer 28 and to an array driver 22, which in turn is coupled to a display array 30. A power supply 50 provides power to all components as included in the particular exemplary display device 40 design.

The network interface 27 includes the antenna 43 and the transceiver 47 so that the exemplary display device 40 can communicate with one or more devices over a network. The network interface 27 may also have some processing capabilities to relieve requirements of the processor 21. The antenna 43 is any antenna for transmitting and receiving signals. In one example, the antenna transmits and receives RF signals according to the IEEE 802.11 standard, including IEEE 802.11(a), (b), or (g). In another example, the antenna transmits and receives RF signals according to the BLUETOOTH standard. In the case of a cellular telephone, the antenna is designed to receive CDMA, GSM, AMPS, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative example, the transceiver 47 can be replaced by a receiver. In yet another alternative, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data may refer to the information that identifies the image characteristics at each location within an image. For example, such image characteristics can include color, saturation, and gray-scale level.

In one example, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

The array driver 22 receives the formatted information from the driver controller 29 and reformats the video data into a parallel set of waveforms that are applied many times per second to the hundreds and sometimes thousands of leads coming from the display's x-y matrix of pixels.

In one example, the driver controller 29, array driver 22, and display array 30 are appropriate for any of the types of displays described herein. For example, driver controller 29 is a conventional display controller or a bi-stable display controller (for example, an interferometric modulator controller). In another example, array driver 22 is a conventional driver or a bi-stable display driver (for example, an interferometric modulator display). Driver controller 29 may be integrated with the array driver 22. Such is common in highly integrated systems such as cellular phones, watches, and other small area displays. In yet another example, display array 30 is a display array or a bi-stable display array (for example, a display including an array of interferometric modulators).

The input device 48 allows a user to control the operation of the exemplary display device 40. Input device 48 may include a keypad, such as a QWERTY keyboard or a telephone keypad, a button, a switch, a touch-sensitive screen, or a pressure- or heat-sensitive membrane. In one example, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, power supply 50 may be a rechargeable battery, such as a nickel-cadmium battery or a lithium ion battery. In another example, power supply 50 is a renewable energy source, a capacitor, or a solar cell including a plastic solar cell, and solar-cell paint. In another example, power supply 50 is configured to receive power from a wall outlet.

In some examples, control programmability resides, as described above, in a driver controller which can be located in several places in the electronic display system. In some examples, control programmability resides in the array driver 22. The above-described optimizations may be implemented in any number of hardware and/or software components and in various configurations.

Figure 7A:
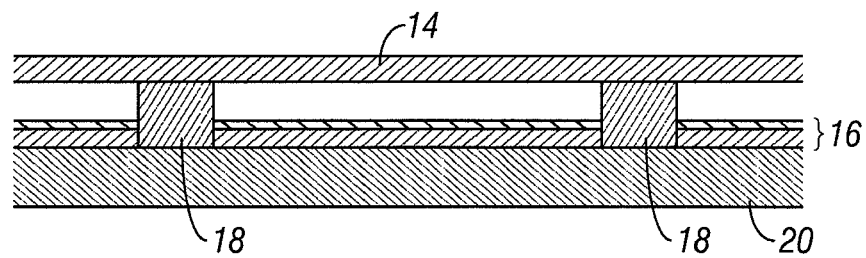
FIG. 7A is a cross section of the device of FIG. 1.
Figure 7B:
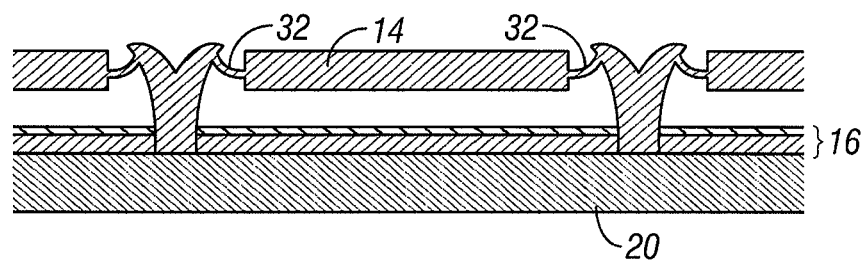
FIG. 7B is a cross section of an alternative interferometric modulator.
Figure 7C:
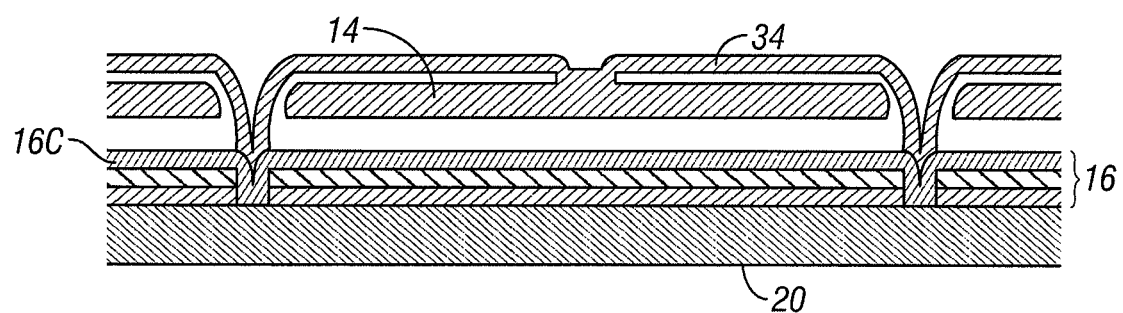
FIG. 7C is a cross section of another alternative interferometric modulator.
Figure 7D:
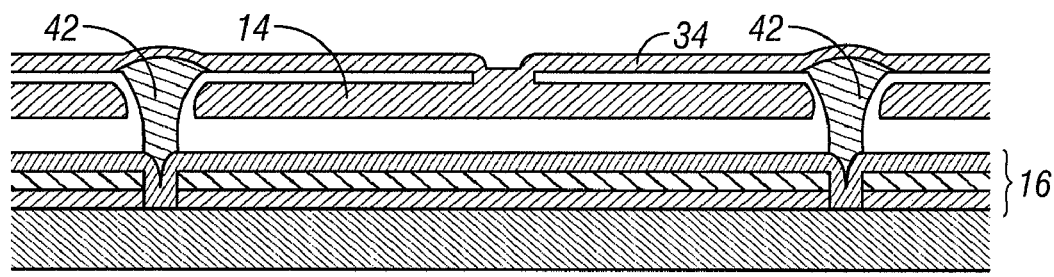
FIG. 7D is a cross section of yet another alternative interferometric modulator.
Figure 7E:
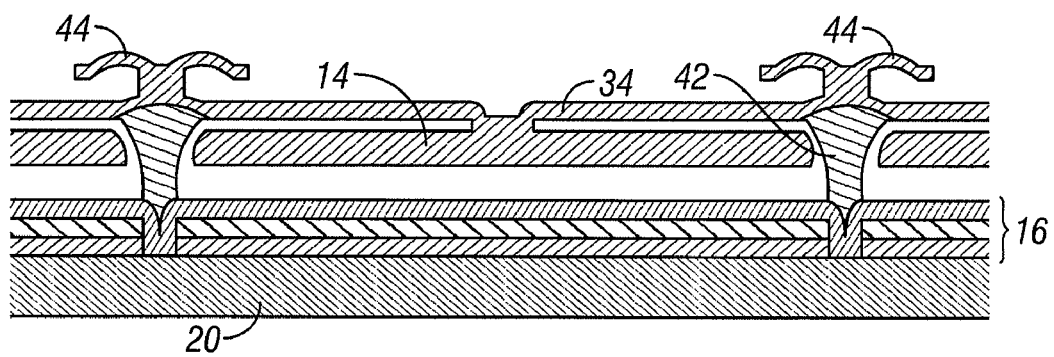
FIG. 7E is a cross section of an additional alternative interferometric modulator.

The details of the structure of interferometric modulators that operate in accordance with the principles set forth above may vary widely. For example, FIGS. 7A-7E illustrate five different embodiments of the movable reflective layer 14 and supporting structures. FIG. 7A is a cross section of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may include a flexible metal. The deformable layer 34 connects, directly or indirectly, to the substrate 20 around the perimeter of the deformable layer 34. These connections are herein referred to as support posts. FIG. 7D shows support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The device illustrated in FIG. 7E is based on FIG. 7D, but may also be adapted to work with any of the variations illustrated in FIGS. 7A-7C. As shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

As shown in FIG. 7, the interferometric modulators may function as direct-view devices, in which images are viewed from the front side of the transparent substrate 20, the side opposite to that upon which the modulator is arranged. In these examples, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the examples shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Some applications may include a large display (for example, a large rectangular display of greater than about 14 inches by 16 inches for television or multimedia applications) that may be viewed well in conditions of reduced ambient illumination. For such applications, reflective displays such as described above with respect to FIGS. 1 through 7 may not work well because reflective displays might include a frontlight, and the frontlight performance of the reflective display may suffer when applied to large diagonal screens (for example, due to a lack of uniform light distribution across the display). There are various ways to apply frontlight to a reflective-type interferometric modulator display, but such frontlights may be inefficient and diminish the perceived performance of the display.

Certain embodiments described below provide a transmissive backlit interferometric modulator or backlit interferometric modulator display comprising a plurality of interferometric modulator structures. In one embodiment the backlit display includes a backlight and an array of transmissive interferometric modulator structures, each interferometric modulator comprising a fixed and a moving optical stack. The transmissive interferometric modulators cause light within the desired wavelength range to be transmitted while absorbing at least a portion of the remaining light. Embodiments relating to a transmissive interferometric modulator display may be incorporated in a display application such as described above with regard to FIGS. 1 through 7E.

Figure 8:
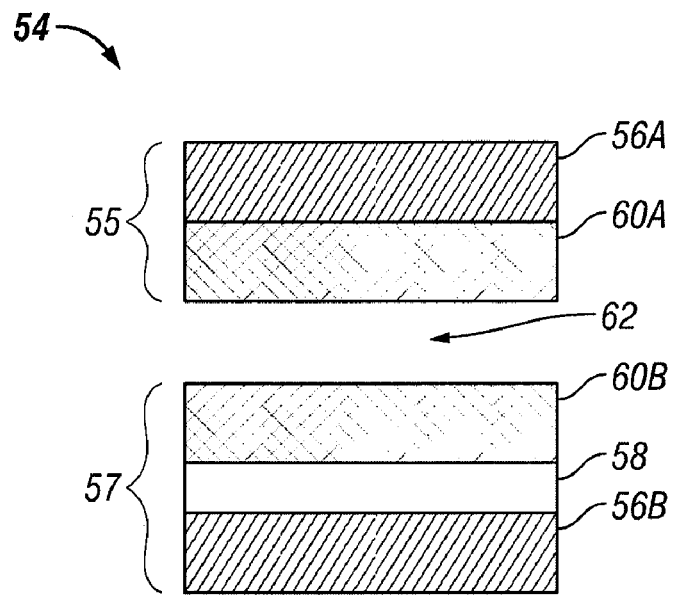
FIG. 8 is a diagram of one embodiment of a transmissive interferometric modulator.

One embodiment of a stack of optical films within a transmissive interferometric modulator 54 is illustrated in FIG. 8. MEMS structures such as those shown in FIGS. 1-7 that incorporate the optical films are not shown for clarity. FIG. 8 is a cross section diagram of the transmissive interferometric modulator 54 comprising a fixed optical stack (fixed transmissive layer) 55 and a moving optical stack (moving transmissive layer) 57 separated by a gap 62 (for example, an air gap, partial vacuum, dielectric fluid or other gas, etc.). As illustrated in FIG. 8, the fixed optical stack 55 includes a transparent substrate 56A, which can include glass and a 35 nm silver layer 60A. The moveable optical stack 57 includes a 35 nm silver layer 60B, a transparent electrode layer 58, and a transparent substrate layer 56B, which, like transparent substrate 56A may include glass.

In operation, a pixel of the transmissive interferometric modulator display is in either a bright or a dark state. A light source illuminating the display element and a user of the display element (not shown) may be located on different sides of the display element. In the bright ("on" or "open") state, the display element transmits a large portion of incident visible light to the user in the desired wavelength range. When in the dark ("off" or "closed") state, the display elements block substantially all light to the user. Depending on the embodiment, the light transmission properties of the "on" and "off" states may be reversed. In some embodiments MEMS pixels are configured to transmit predominantly at selected colors, allowing for a color display in addition to black and white.

In some embodiments, an interferometric modulator display includes a row/column array of these transmissive interferometric modulators. Each interferometric modulator includes a pair of transmissive layers positioned at a variable and controllable distance from each other to form a resonant optical gap with at least one variable dimension. In one embodiment, one of the transmissive layers may be moved between two positions. In the first position, referred to herein as the relaxed position, the movable transmissive layer is positioned at a relatively large distance from a fixed transmissive layer. In the second position, referred to herein as the actuated position, the moveable transmissive layer is positioned more closely adjacent to the fixed transmissive layer. Incident light that transmits through the two layers interferes constructively or destructively depending on the height of the gap between the fixed and movable layers, producing either an overall transmissive or non-transmissive state for each pixel in a desired wavelength range. A pixel passes light of a particular wavelength range in the transmissive state and blocks substantially all visible light over the same wavelength range in the non-transmissive state. In certain embodiments the movable transmissive layer may move to a third position other than the relaxed position and the actuated position.

In the transmissive interferometric modulator 54, the movable transmissive layer 57 in a relaxed position is at a predetermined distance from the fixed transmissive layer 55. The transmissive layers 55 and 57, as referenced herein, may be formed from a variety of materials that are partially transparent such as various dielectrics and/or transparent conductive oxides (for example, ITO). In some embodiments, the transmissive layers 55 and 57 are formed from transparent dielectrics.

The transmissive layers 55 and 57 are operatively coupled to electrodes that provide for electrostatic actuation to vary the distance between transmissive layers 55 and 57. In some embodiments the transmissive layers 55 and 57 are operatively connected to ring-shaped electrodes (not shown), where the electrodes surround the transmissive layers 55 and 57. For example, in an embodiment similar to that shown in FIG. 7B, the movable element 14 may include transmissive layers 55 and 57 in the center of the pixel, while the ring-shaped electrodes near the posts provide for electrostatic actuation. The electrodes may include electrically conductive material, for example, metal or metal oxide. The electrodes may be shaped similarly and aligned with each other such that the electrodes attract each other under electrostatic forces. In an exemplary embodiment a display includes an array of interferometric modulators deposited on the back side (with respect to a viewer) of a substantially transparent substrate.

In one embodiment, the electrodes include electrically conductive material, for example, light absorbing metal or metal oxide. The electrodes may include substantially transparent metal or metal oxide, for example, zinc oxide or ITO. The electrodes may be shaped similarly and aligned with each other such that the electrodes attract each other under electrostatic forces. The electrodes may be ring-shaped such that light transmitted through the transmissive layers can pass through a center transmissive portion surrounded by the electrodes. The center transmissive portion defines the optically active area of one exemplary transmissive interferometric modulator, which is the area of the interferometric modulator where incident light is interferometrically modulated by the movable and fixed transmissive layers. The remainder of the interferometric modulator display is referred to as a non-active area. Electrode configurations other than ring-shaped may also be used for the electrodes.

The transmissive layers 55 and 57 and the electrodes may be fabricated, for example, by depositing one or more of the above layers onto a transparent substrate. Each layer can be formed of one or more layers of materials and can be formed of a single material or a combination of materials.

The movable electrode may be connected to a supporting structure in various ways. For example, in some embodiments the corners of the electrode may be attached to supports through tethers.

With no applied voltage differential across the electrodes, a gap remains between the movable transmissive layer 55 and fixed transmissive layer 57. However, when a potential difference is applied across the electrodes, electrostatic forces pull the electrodes together. If the voltage is high enough, the tether is deformed and the moveable electrode is forced against the fixed electrode, so that the movable transmissive layer 57 which moves along with the electrode is thus forced against the fixed transmissive layer 55. The behavior is the same regardless of the polarity of the applied potential difference. Therefore, the combination of two partially transmissive layers separated by an air gap may be used to pass light within a wavelength range while absorbing light outside the range.

In one embodiment the display is configured to recycle at least a portion of the light emitted from the backlight. For example, light incident on non-active areas of the pixel from the backlight may be reflected back to the backlight by a reflective black mask. Light incident on active areas of the pixel from the back light may be reflected by one or more of the two transmissive layers 55 and 57 and may re-enter the backlight. The back-reflected light can be recycled and can enter the array of interferometric modulators for a second time in an active area.

Figure 9A:
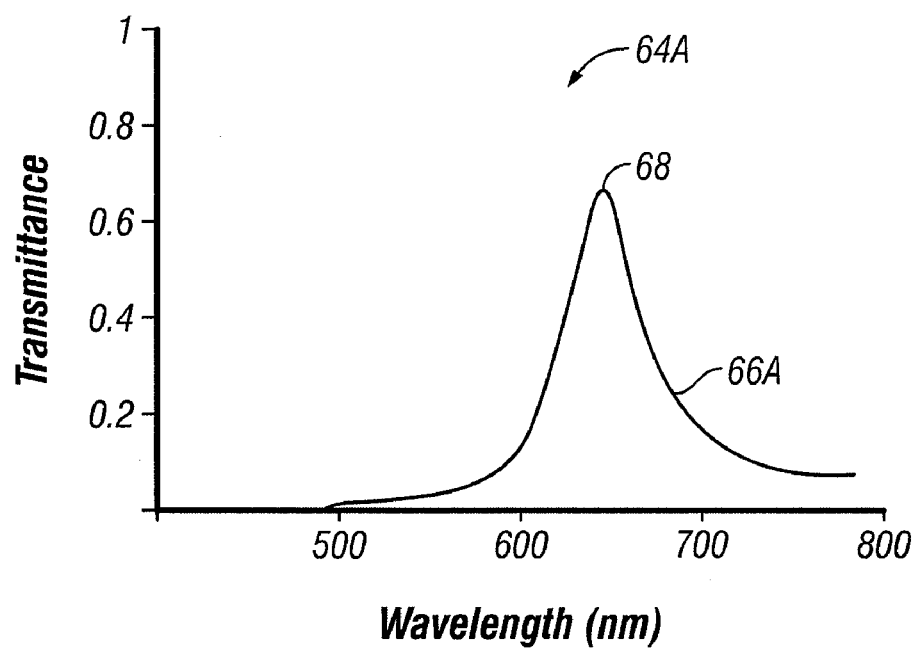
FIG. 9A is a graph illustrating simulated transmittance of the interferometric modulator of FIG. 8 over a range of wavelengths when the interferometric modulator is in the bright state.

FIG. 9A is a graph 64A illustrating simulated transmittance 66A as a function of wavelength of the interferometric modulator of FIG. 8 when the interferometric modulator is in the bright state. In the bright state the movable layer in the interferometric modulator is in the "up" position. As shown, this embodiment achieves maximum transmittance 68 of light between 600 nm and 700 nm.

Figure 9B:
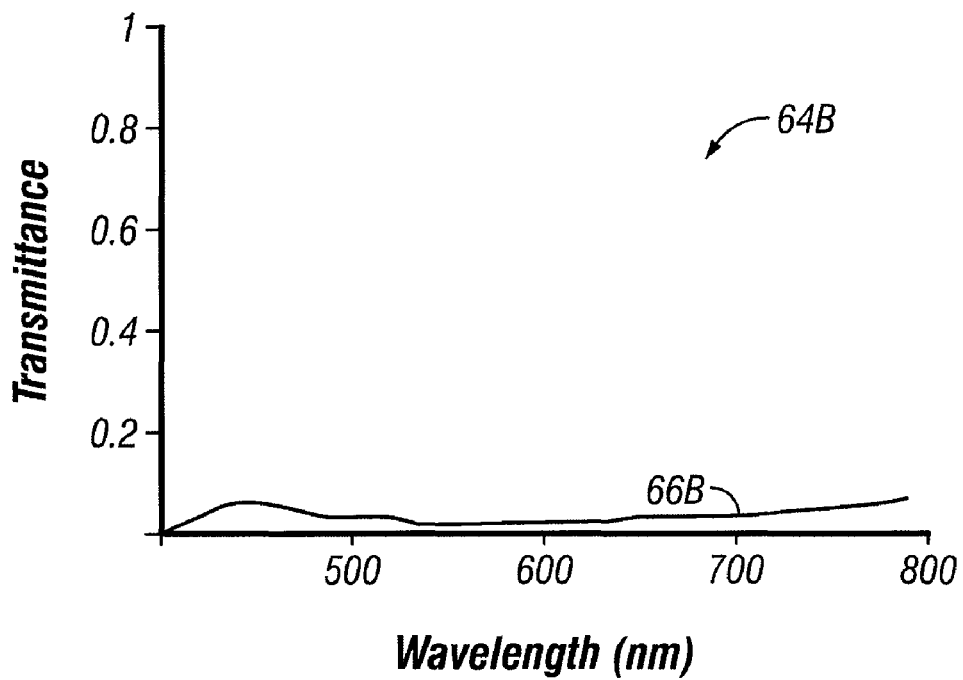
FIG. 9B is a graph illustrating simulated transmittance of the interferometric modulator of FIG. 8 over a range of wavelengths when the interferometric modulator is in the dark state.

FIG. 9B is a graph 64B illustrating simulated transmittance 66B as a function of wavelength of the interferometric modulator of FIG. 8 when the interferometric modulator is in the "dark" state. In the dark state the movable layer in the interferometric modulator is in the "down" position. As illustrated, when the interferometric modulator is in the dark state, substantially all visible light is blocked. In some embodiments "substantially all" includes greater than 90% of light incident on the substrate. In some embodiments "substantially all" includes greater than 95% of light incident on the substrate. In some embodiments "substantially all" includes greater than 98% of light incident on the substrate. In some embodiments "substantially all" includes greater than 99% of light incident on the substrate.

Figure 10:
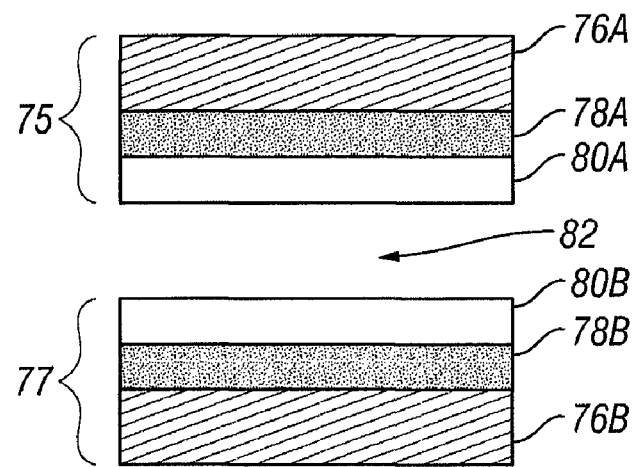
FIG. 10 is another embodiment of a transmissive interferometric modulator that includes two optical stacks separated by an air gap, the optical stacks each including a substrate layer, a silver layer and an $SiO_2$ layer.

Another embodiment of a transmissive interferometric modulator 74 is illustrated in FIG. 10. The transmissive interferometric modulator 74 includes two optical stacks 75, 77 separated by a gap 82 (for example, an air gap). The fixed optical stack 75 includes a substrate layer 76A, a silver layer 80A, and an $SiO_2$ layer 78A. The movable optical stack 77 includes a substrate layer, 76B, a silver layer 80B and an $SiO_2$ layer 78B. In each optical stack the silver layer 80A, 80B borders the air gap 82 and the $SiO_2$ layer 78A, 78B is sandwiched between the silver layer 80A, 80B and the substrate 76A, 76B. In the illustrated embodiment of FIG. 10, each of the $SiO_2$ layers 78A, 78B has a thickness of 94 nm and each of the silver layers 80A, 80B has a thickness of 35 nm.

Figure 11A:
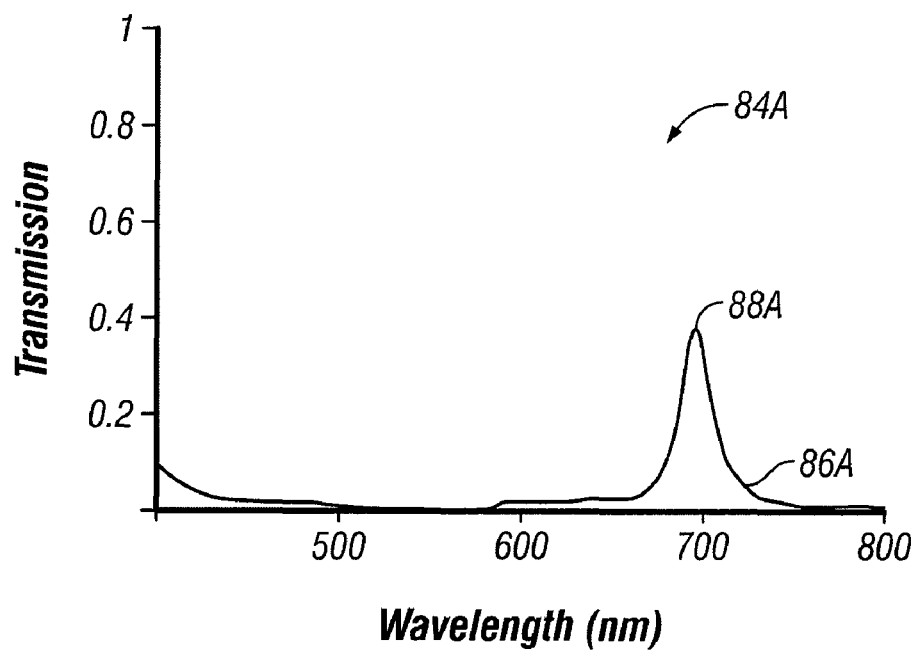
FIG. 11A is a graph illustrating simulated transmittance of the interferometric modulator of FIG. 10 when the air gap is approximately 3000 Å.

FIG. 11A is a graph 84A illustrating modeled transmittance 86A of the transmissive interferometric modulator shown in FIG. 10. The modeled embodiment of FIG. 10A has two optical stacks, each of which includes a substrate layer, a silver layer and an $SiO_2$ layer. As noted above with respect to FIG. 10, each silver layer has a thickness of approximately 35 nm and each $SiO_2$ layer has a thickness of approximately 94 nm. The illustrated modeled transmittance shown in FIG. 11A occurs when the air gap is approximately 3000 Å. A maximum transmittance 88A occurs at approximately 700 nm wavelength.

Figure 11B:
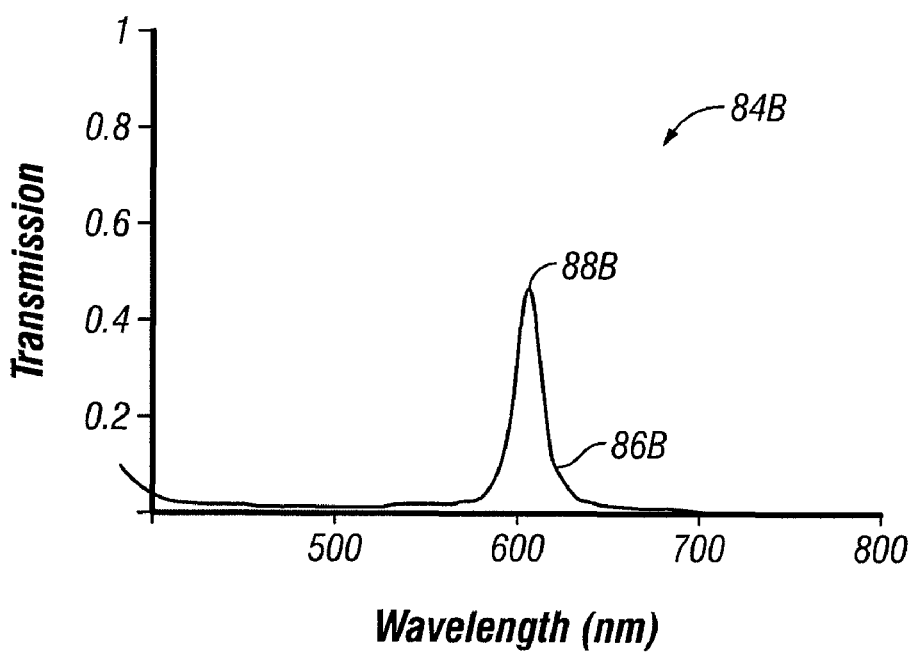
FIG. 11B is a graph illustrating simulated transmittance of the interferometric modulator of FIG. 10 when the air gap is approximately 250 Å.

FIG. 11B is a graph 84B illustrating modeled transmittance 86B of the transmissive interferometric modulator of FIG. 10 when the air gap is approximately 250 Å. A maximum transmittance 88B occurs at approximately 600 nm wavelength.

Figure 11C:
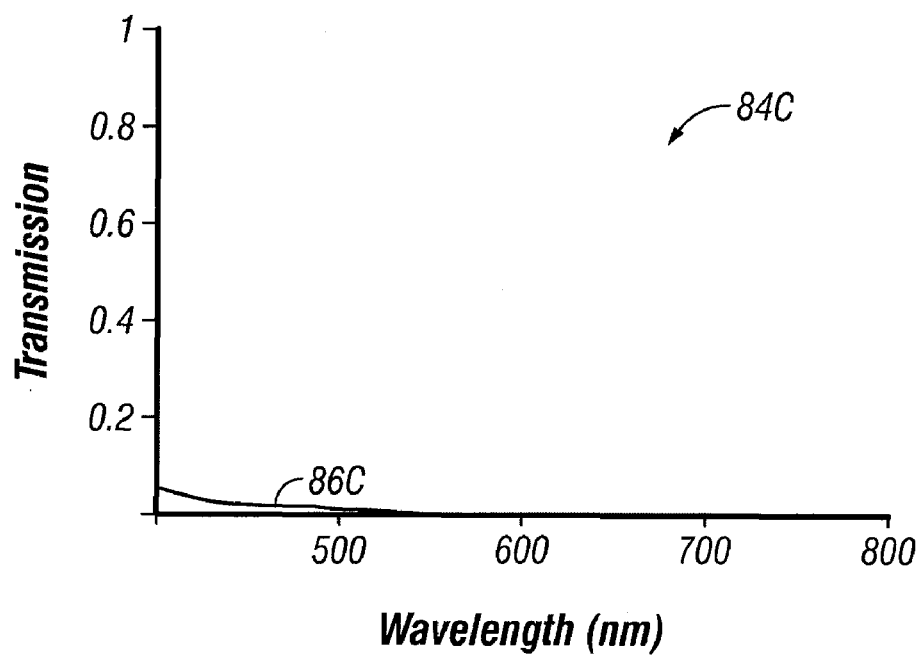
FIG. 11C is a graph illustrating simulated transmittance of the interferometric modulator of FIG. 10 when the air gap is approximately 150 Å.

FIG. 11C is a graph 84C illustrating modeled transmittance 86C of the interferometric modulator of FIG. 10 when the air gap is approximately 150 Å, in the "down" state. As illustrated, substantially all incident light is blocked and thus, very little of the incident light is transmitted.

Figure 11D:
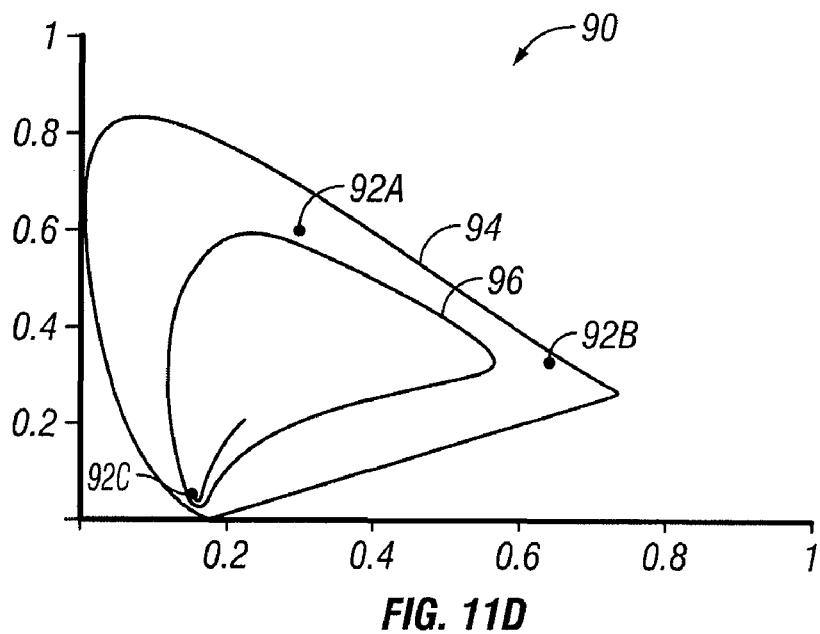
FIG. 11D is a color plot illustrating the simulated color spectra for the embodiment of FIG. 10.

FIG. 11D is a modeled color plot ("color space chromaticity diagram") 90 illustrating the achievable color spectra for the embodiment of FIG. 10. Within the outer curved boundary 94 are all of the colors visible to the average person, also known as the gamut of human vision. Within the gamut of human vision are points 92A, 92B and 92C corresponding to the colors green, red and blue respectively. Line 96 depicts the modeled spectral reflectance for the embodiment of the transmissive interferometric modulator of FIG. 10 for varying gap distances.

Figure 12A:
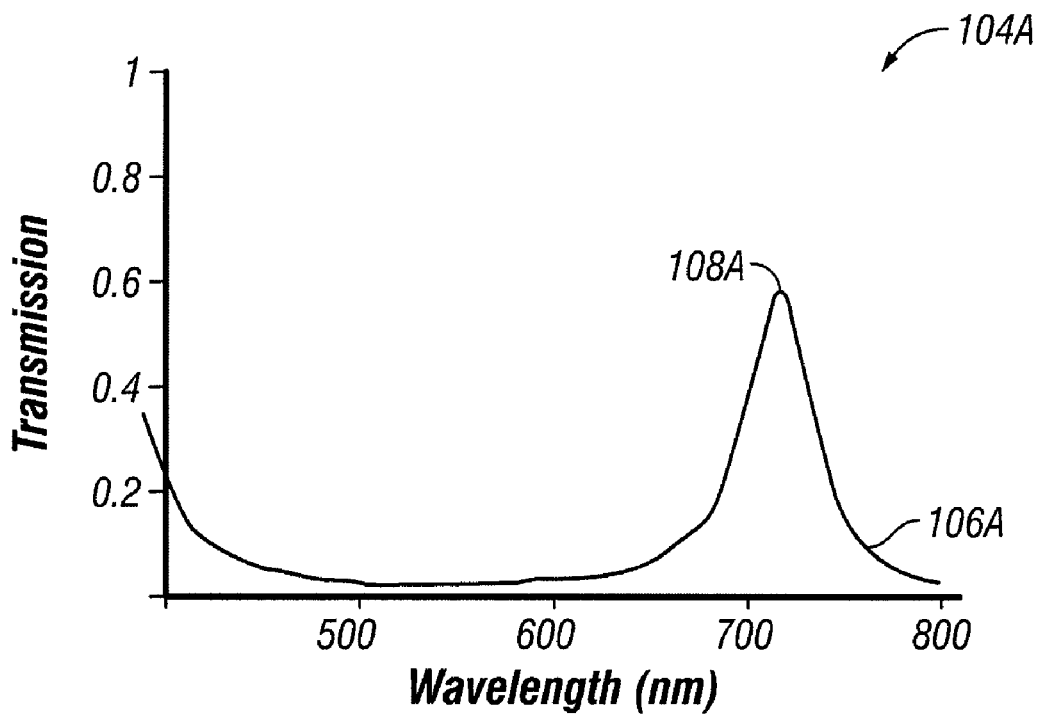
FIG. 12A is a graph illustrating simulated transmittance of the interferometric modulator of FIG. 10 with a silver thickness of 20 nm when the air gap is approximately 3000 Å.

FIG. 12A is a graph 104A illustrating modeled transmittance plot 106A of a transmissive interferometric modulator similar to the embodiment shown in FIG. 10. The transmittance graph 104A is based on an embodiment that has two optical stacks, each of which includes a substrate layer, a silver layer and an $SiO_2$ layer. Different from the embodiment of FIG. 10, each of the silver layers in the embodiment responsible for the modeled graph of FIG. 12A has a thickness of 20 nm. The thickness of the $SiO_2$ layers remains 94 nm. The illustrated modeled transmittance plot 106A of the embodiment of FIG. 12A occurs when the air gap has a thickness of approximately 3000 Å. A maximum transmittance 108A for this embodiment of a transmissive interferometric modulator occurs at a wavelength of slightly greater than 700 nm.

Figure 12B:
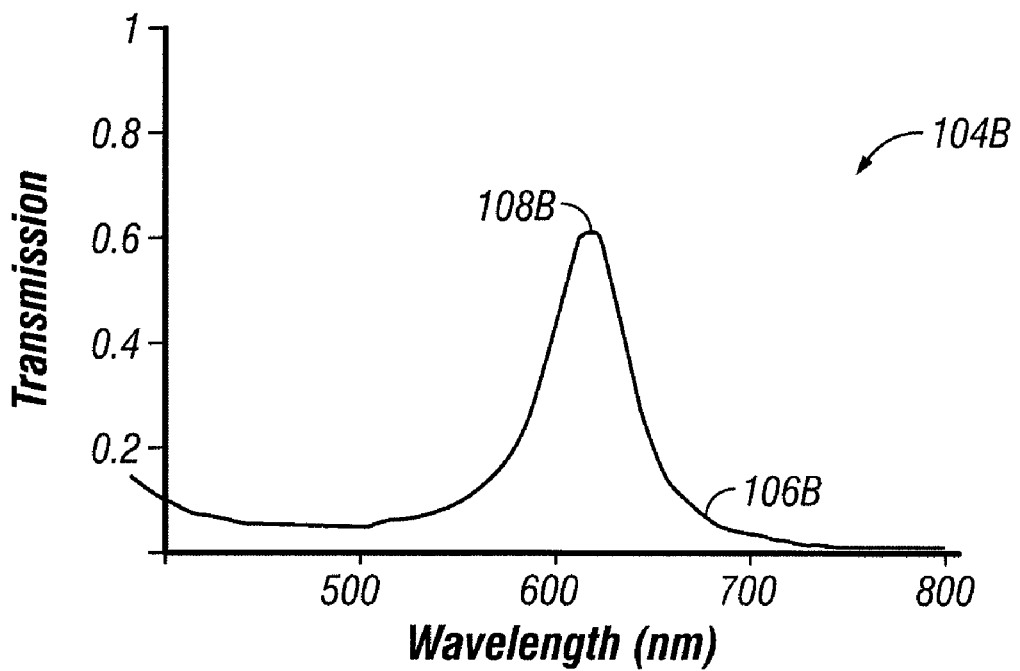
FIG. 12B is a graph illustrating simulated transmittance of the interferometric modulator of FIG. 10 with a silver thickness of 20 nm when the air gap is approximately 250 Å.

FIG. 12B is a graph 104B illustrating modeled transmittance plot 106B of the embodiment responsible for the modeled graph of FIG. 12A (configuration as depicted in FIG. 10 but with 20 nm Ag layers 80A, B, and 94 nm SiO2 layers 78A, B) when the air gap is approximately 250 Å. A maximum transmittance 108B of the transmissive interferometric modulator occurs at a wavelength of slightly greater than 600 nm.

Figure 12C:
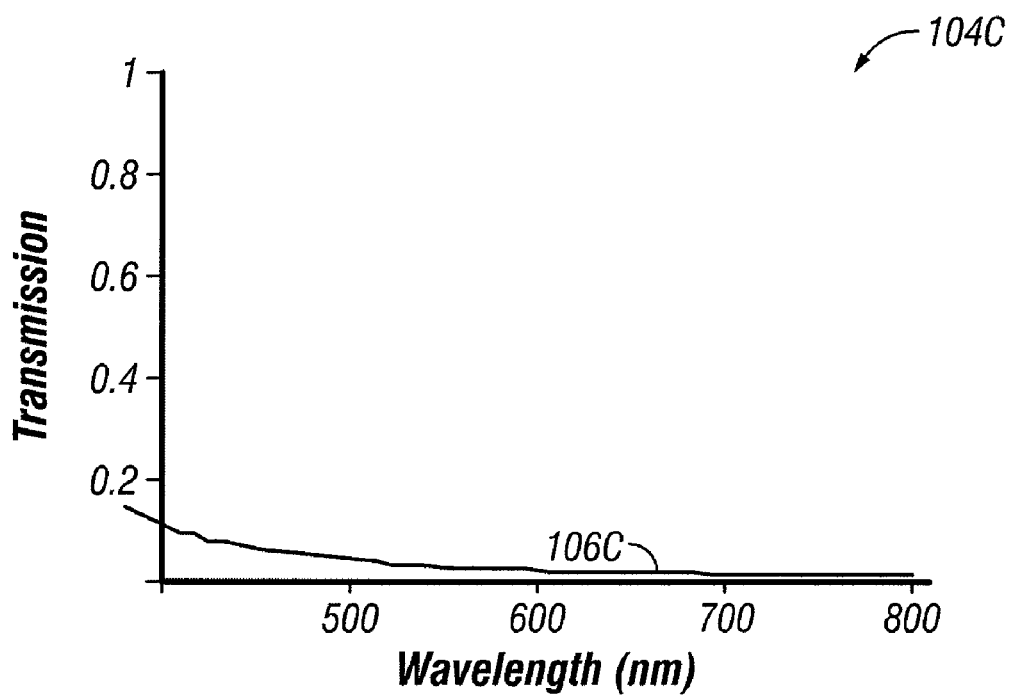
FIG. 12C is a graph illustrating simulated transmittance of the interferometric modulator of FIG. 10 with a silver thickness of 20 nm when the air gap is approximately 150 Å.

FIG. 12C is a graph 104C illustrating modeled transmittance plot 106C of the interferometric modulator as depicted in FIG. 10 but with 20 nm Ag layers 80A, B, and 94 nm SiO2 layers 78A, B when the air gap is approximately 150 Å, in the "down" state. As illustrated, substantially all incident light is blocked and thus, very little of the incident light is transmitted over the range of wavelengths shown.

Figure 12D:
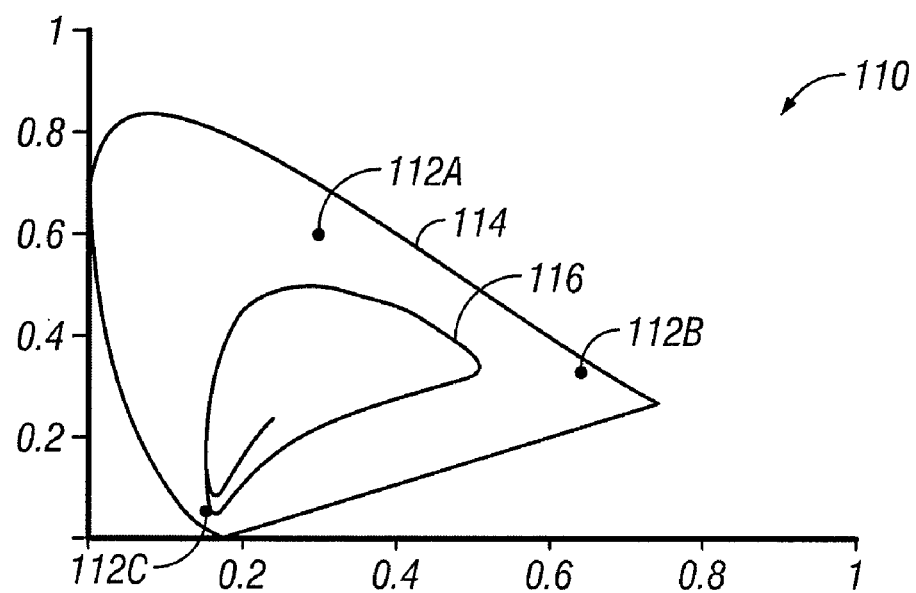
FIG. 12D is a color plot illustrating the simulated color spectra for the embodiment of FIG. 10 with a silver thickness of 20 nm.

FIG. 12D is a color space chromaticity diagram 110 illustrating the simulated achievable color spectra for the embodiment that created the modeled transmission graph of FIG. 12A (configuration as depicted in FIG. 10 but with 20 nm Ag layers 80A, B, and 94 nm SiO2 layers 78A, B). Within the outer curved boundary 114 are all of the colors visible to the average person, also known as the gamut of human vision. Within the gamut of human vision are color points 112A, 112B and 112C corresponding to the colors green, red and blue respectively. Line 116 depicts the modeled spectral reflectance for the embodiment of the transmissive interferometric modulator used to create the graph 104A of FIG. 12A for varying gap distances.

Figure 13:
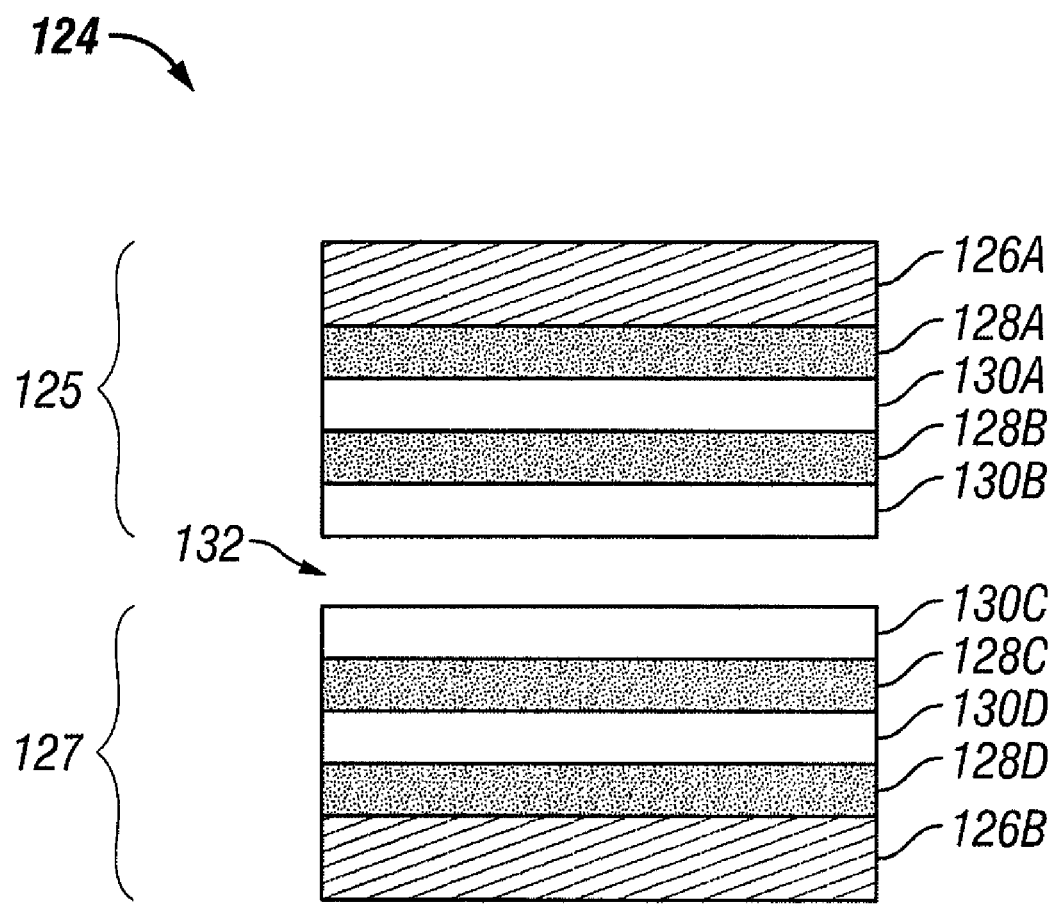
FIG. 13 is another embodiment of a transmissive interferometric modulator that includes two optical stacks separated by an air gap, the optical stacks each including a substrate layer and alternating layers of SiC and $MgF_2$.

FIG. 13 is another embodiment of a transmissive interferometric modulator 124 comprising two optical stacks 125, 127 separated by an air gap 132. The fixed optical stack 125 includes a substrate layer 126A and alternating layers of SiC 130A, 130B, and $MgF_2$ 128A, 128B. The movable optical stack 127 includes a substrate 126B and alternating layers of SiC 130C, 130D and $MgF_2$ 128C, 128D. In this embodiment, each optical stack 125, 127 has two layers of SiC and two layers of $MgF_2$ disposed on a substrate such that each optical stack has a layer of SiC (130B 130C respectively) that borders the air gap 132. As illustrated, each SiC layer 130A, 130B, 130C, 130D has a thickness of 52 nm and each MgF$_2$ layer 128A, 128B, 128C, 128D has a thickness of 99 nm.

Figure 14A:
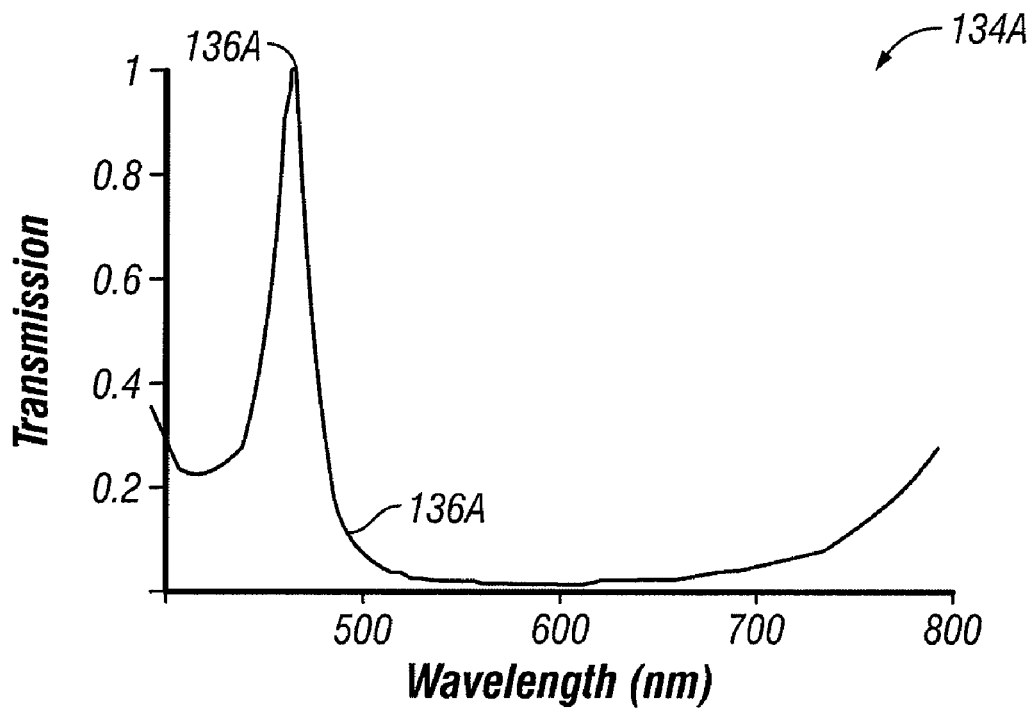
FIG. 14A is a graph illustrating simulated transmittance of the interferometric modulator of FIG. 13 when the air gap is approximately 2000 Å.

FIG. 14A is a graph 134A illustrating simulated transmittance plot 136A of the interferometric modulator of FIG. 13 when the air gap 132 is approximately 2000 Å. A maximum transmittance 138A (approximately 1.0, 100% transmission) occurs at a wavelength of approximately 450 nm. For the range of wavelengths between 500 nm and 700 nm approximately all incident light is blocked.

Figure 14B:
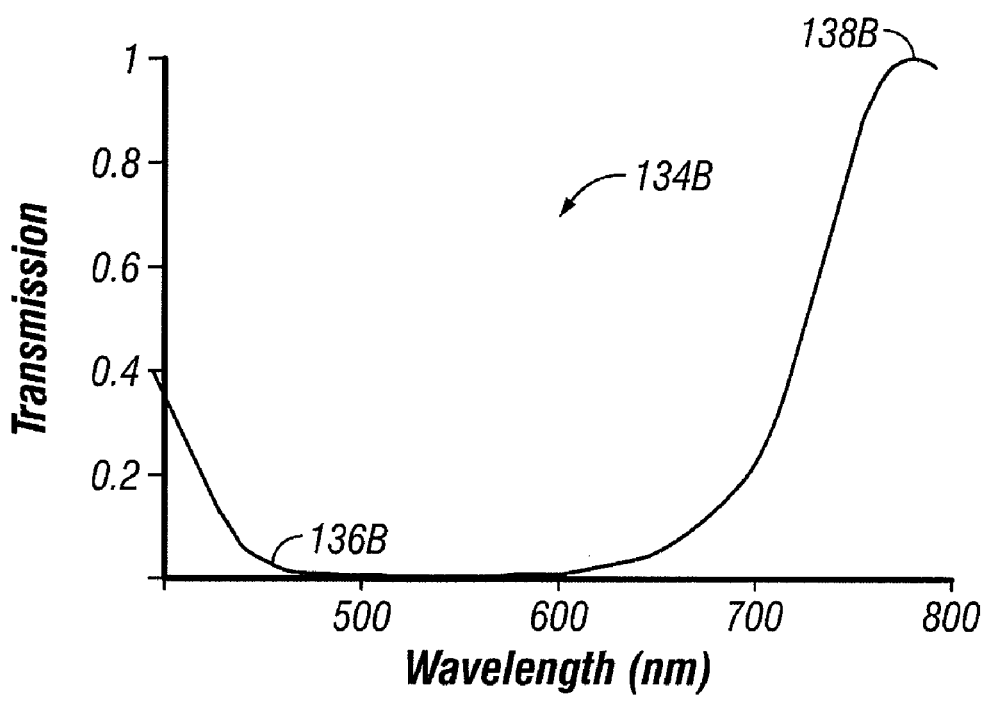
FIG. 14B is a graph illustrating simulated transmittance of the interferometric modulator of FIG. 13 nm when the air gap is approximately 1000 Å.

FIG. 14B is a graph 134B illustrating simulated transmittance plot 136B of the interferometric modulator of FIG. 13 when the air gap 132 is approximately 1000 Å. A maximum transmittance 138B (approximately 1.0) occurs at wavelengths just below 800 nm. For the range of wavelengths between 450 nm and 650 nm approximately all incident light is blocked.

Figure 14C:
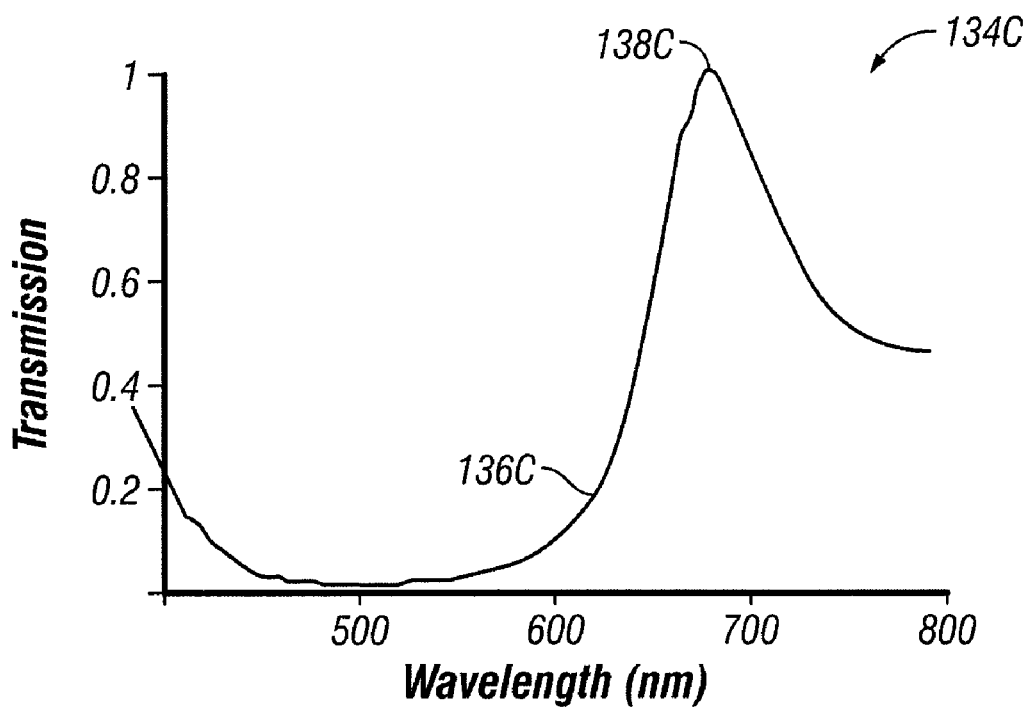
FIG. 14C is a graph illustrating simulated transmittance of the interferometric modulator of FIG. 13 when the air gap is approximately 500 Å.

FIG. 14C is a graph 134C illustrating simulated transmittance plot 136C of the interferometric modulator of FIG. 13 when the air gap 132 is approximately 500 Å. A maximum transmittance 138C (approximately 1.0) occurs at wavelengths just below 700 nm. For the range of wavelengths between 450 nm and 600 nm approximately all incident light is blocked.

Figure 14D:
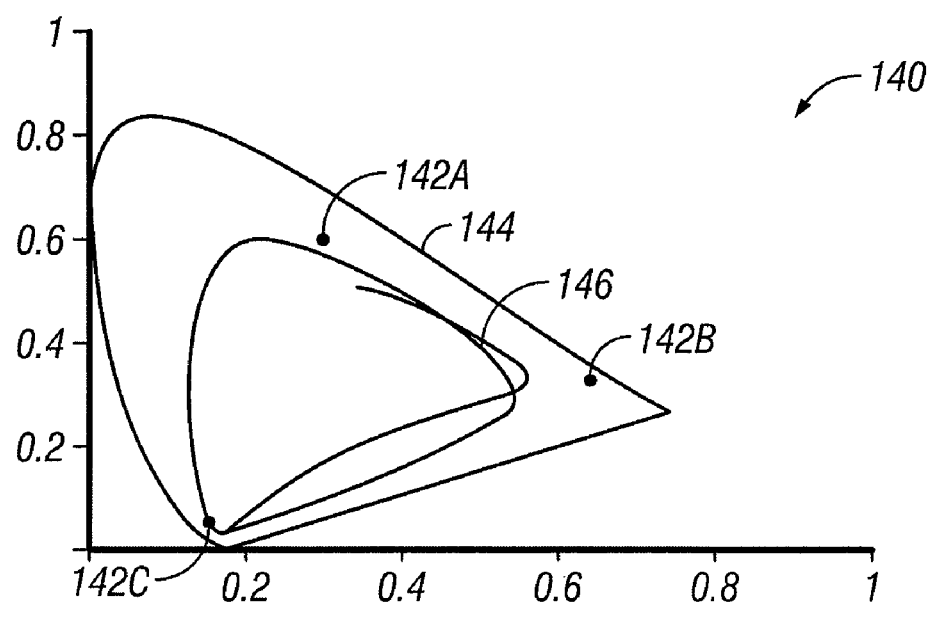
FIG. 14D is a color plot illustrating the simulated color spectra for the embodiment of FIG. 13.

FIG. 14D is a simulated color space chromaticity diagram 140 illustrating the achievable color spectra for the embodiment of FIG. 13. Within the outer curved boundary 144 are all of the colors visible to the average person, also known as the gamut of human vision. Within the gamut of human vision are color points 142A, 142B, 142C corresponding to the colors green, red and blue, respectively. Line 146 represents the modeled spectral reflectance of the transmissive interferometric modulator 124 of FIG. 13 for varying gap distances.

Projection IMOD

Projection display systems may include IMOD modulators. The attributes of the projection displays may be particularly adapted to the IMOD characteristics.

Two common spatial light modulators (SLMs) in use today are liquid crystal displays (LCDs) and digital micromirror devices (DMDs). There are several different types of LCDs in use while the DMD™ is a unique device provided by Texas Instruments, Inc. Three types of common LCDs are transmissive, which are based on two glass panes, reflective, which are based on two glass panes, and reflective, which are based on a glass pane bonded to a silicon substrate. The latter reflective types are normally referred to as a liquid crystal on silicon (LCOS) devices.

All liquid crystal devices suffer from light-throughput inefficiency due to (1) use of polarized light, (2) realities of low aperture ratios and/or (3) inherently low optical transmissions of materials used to create the parallel-plate LCD structure. Further, the response time of LCD materials, although continually improving, can be slow relative to video speeds. The Texas Instruments device mentioned above has advantages including both an inherently higher optical throughput and a fast response time. Thus, it can be made on silicon substrates and the device may be small to keep costs low. This leads to low aperture ratios. Also, the most common DMD-based products use one device in a color field sequential fashion to avoid having to use three devices to modulate separate red, green and blue channels. The above factors lead to illumination inefficiencies on the order of those found in LCD-based projectors. In fact, when viewing competing LCD and DMD products, performances of each are found to be generally the same. The performance of each is deemed adequate and sales of both products are strong.

Nevertheless, it can be desirable to lower the cost of these modulators, lower the cost of the entire projection system and reduce power consumption. Each of these goals can be accomplished if the illumination systems were more efficient.

As mentioned above, costs have been lowered by using single devices (Texas Instruments) and keeping LCD sizes small (various manufacturers). These approaches limit performance, but run counter to a goal of lowering power consumption. Additionally, there has been extensive innovation in projector architecture. Unfortunately, new architectures may include extensive retooling costs to yield only marginal performance gains.

FIGS. 15-18 show four different approaches to integrating an IMOD device into reflective and transmissive projection systems. FIGS. 19A-19D illustrate four alternative approaches amenable to the use of an IMOD modulator in a transmissive projection system. The system may be of one of the types illustrated in FIGS. 15-18 and discussed below. The IMOD architecture can be fairly agnostic to architectural configuration within the system. This can be an advantage since current modulator types prefer a particular architecture over another. Thus, in some embodiments the IMOD device is operated either in an area modulation scheme (such as that used in direct-view IMOD displays) or a pulse width modulation scheme (such as that used by the DMD) to achieve gray scale.

Figure 15:
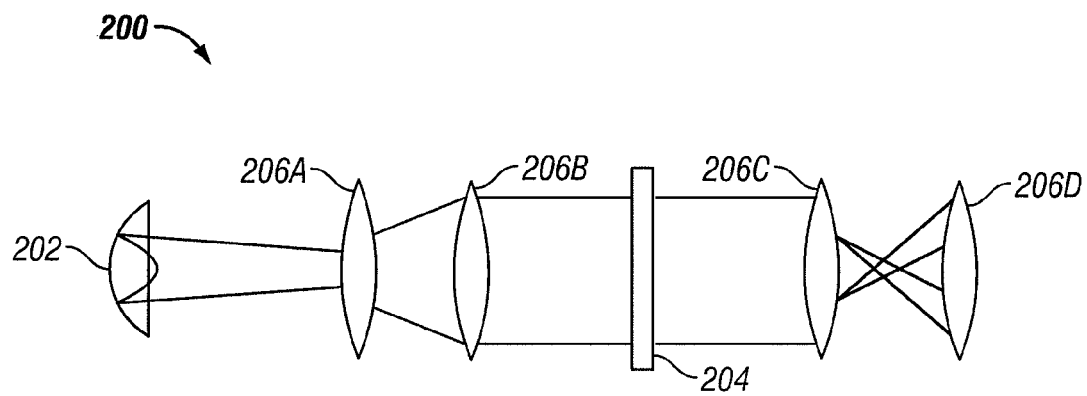
FIG. 15 is a side view of a transmissive projection system integrating an IMOD device.

FIG. 15 illustrates a transmissive IMOD projection device 200. The device 200 includes a light source 202 configured to propagate light through a transmissive interferometric modulator ("IMOD") 204 and a series of lenses. In some embodiments the light source 202 is a lamp. As illustrated in FIG. 15, light from the light source 202 passes through a first lens 206A and a second lens 206B before entering the back of the transmissive IMOD 204. After passing through the transmissive IMOD 204 the light passes through a third lens 206C and a fourth lens 206D. The transmissive IMOD 204 is placed at the back focal plane of the combination of lenses 206A and 206B, which corresponds to the Fourier transform plane of the combination of lenses 206A and 206B. Thus, in the illustrated embodiment of FIG. 15, the first lens 206A and the second lens 206B produce an illumination pattern on the transmissive IMOD 204 that corresponds to the Fourier transform of the light source 202. Thus, a light source 202 that is effectively a point source, for example, would advantageously produce a uniform illumination pattern on the IMOD array 204. The Fourier transform of the light distribution of the light source 202 is transmitted through the transmissive IMOD 204, which modulates the light distribution. The modulated light distribution propagates through lenses 206C and 206D, which are disposed to image the transmissive IMOD 204 onto a projection screen for viewing. In this embodiment the third and fourth lenses, 206C and 206D, are also configured provide an inverted image of the IMOD 204 on the projection screen.

Figure 16:
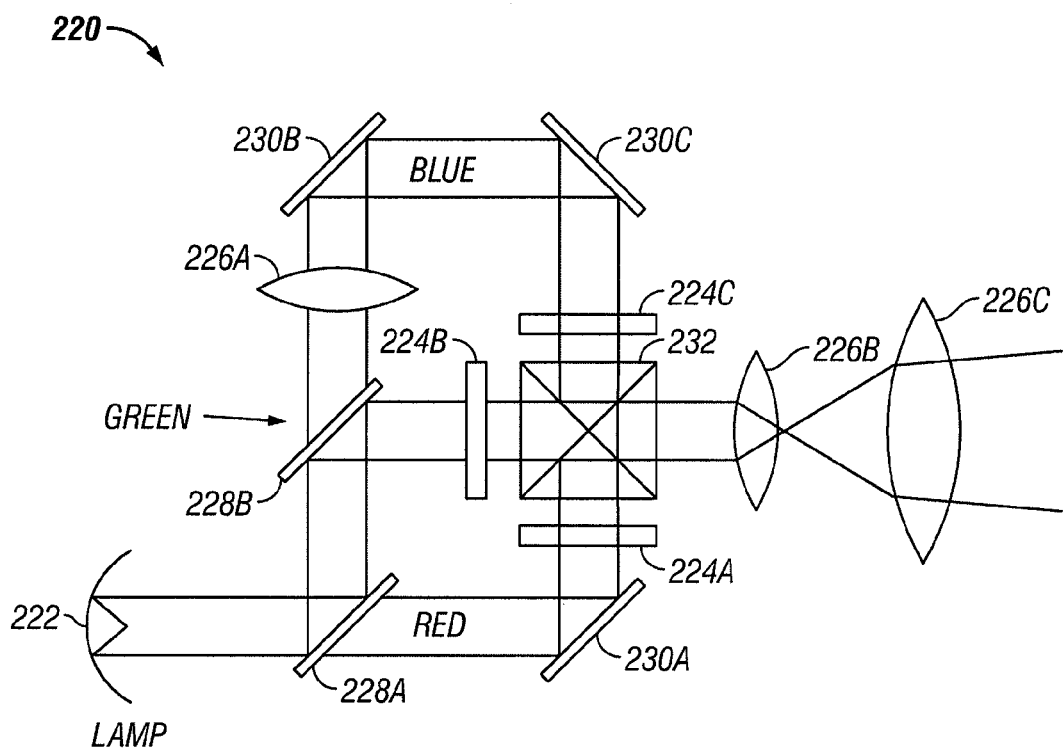
FIG. 16 is a top plan view of a transmissive projection system integrating three IMOD devices.

FIG. 16 illustrates a top plan view of another transmissive IMOD projection device 220. The device 220 includes a light source 222, transmissive IMODs 224A, 224B, 224C lenses 226A, 226B, 226C, dichromatic filters 228A, 228B and mirrors 230A, 230B, 230C. In operation, light is propagated from the light source 222 and is split by wavelength by a first dichroic filter 228A. In the illustrated embodiment, red light passes through the first dichroic filter 228A, which light then strikes first mirror 230A and is reflected to first transmissive IMOD 224A. Green and blue light are reflected by the first dichroic filter 228A to a second dichroic filter 228B. Green light is reflected by second dichroic filter 228B and into second transmissive IMOD 224B. Blue light passes through the second dichroic filter 228B and then passes through first lens 226A before being reflected first by second mirror 230B and then reflected by third mirror 230C before entering third transmissive IMOD 224C.

Figure 19A:
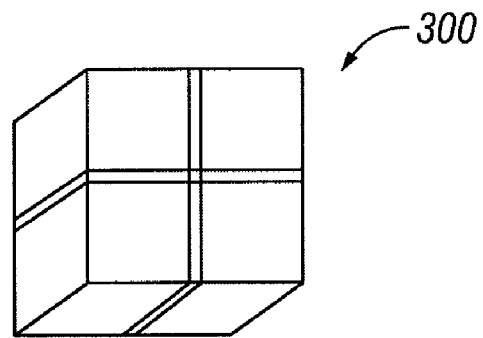
FIG. 19A is an isometric projection view of one type of architecture used in a light combiner.

The red light passing through first transmissive IMOD 224A, the green light passing through second transmissive IMOD 224B and the blue light passing through third transmissive IMOD 224C are all recombined in combiner cube 232. Light exiting the combiner cube 232 is inverted and brought to focus by the lens group comprised of second lens 226B and third lens 226C. In some embodiments a combiner cube 232 uses a color rotator architecture of the type disclosed in U.S. Patent Application Publication No. 2005/0157265, which is hereby incorporated by reference in its entirety. The color rotator architecture uses a plurality of transparent cubes separated by polarization rotating films or notch films to combine the components of red, green and blue light into white light exiting the combiner cube 232. In some embodiments the transparent cubes are coated with an antireflection coating. FIG. 19A is an isometric projection view illustrating a color rotator architecture 300.

Figure 19B:
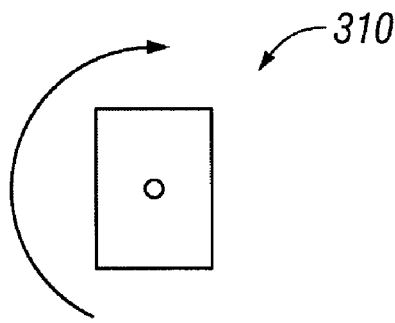
FIG. 19B is a top view of one type of architecture used in a light combiner.

In some embodiments the individual red, green, and blue color beams are combined in the temporal domain rather than the geometric domain by use of a rotating prism cube of the type disclosed in U.S. Pat. No. 5,416,514, which is hereby incorporated by reference in its entirety. The prism assembly has four equal flat sides and is rotated about its central longitudinal axis. The rotation of the prism assembly causes red, green and blue band of colors to be scanned downwardly (or upwardly) in a sequential manner by refraction. FIG. 19B is a side plan view illustrating this type of rotating prism assembly architecture 310.

Figure 19C:
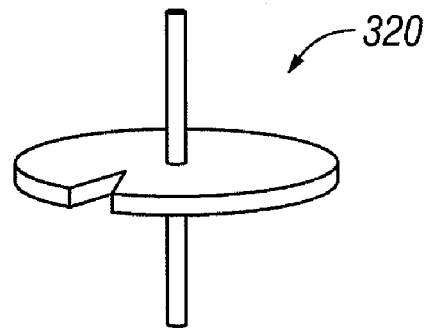
FIG. 19C is a side elevational view of one type of architecture used in a light combiner.

In some embodiments, temporal combining is accomplished through the use of a rotating disk architecture to combine red, green and blue light. Some types of rotating disk architecture are disclosed in U.S. Pat. No. 6,870,581, which is hereby incorporated by reference in its entirety. FIG. 19C is an elevational side view illustrating a rotating disk architecture 320. As illustrated, the rotating disk architecture 320 has a disk with an axle that allows the disk to spin. The element spins fast enough to cause red, blue and green color bands to sweep so rapidly across the viewing plane that the viewer perceives no motion artifacts, and the displayed colors appear to be fully combined, even though the individual beams are out of phase with each other.

Figure 19D:
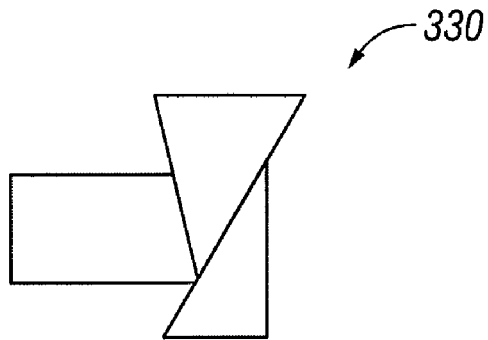
FIG. 19D is a top view of one type of architecture used in a light combiner.

In some embodiments, a combiner cube 232 uses a color prism architecture. As with the architectures referenced above, the color prism architecture is used to combine the red, green and blue light into white light exiting the combiner cube 232 in a single direction. Some types of color prism architecture are disclosed in U.S. Patent Application Publication No. 2003/0081178, which is hereby incorporated by reference in its entirety. FIG. 19D is a top plan view illustrating one type of color prism architecture 330.

Figure 17:
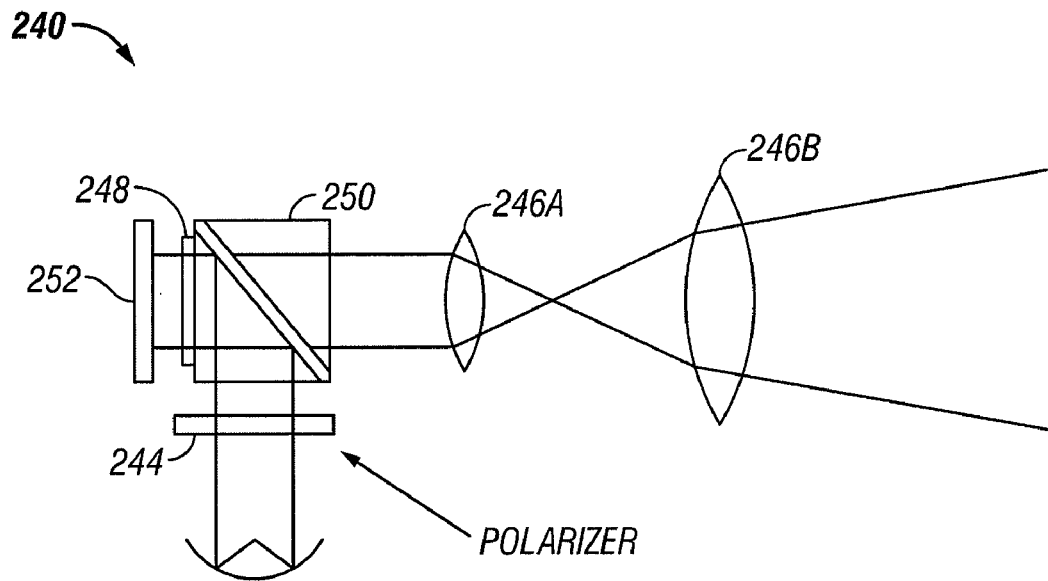
FIG. 17 is a top plan view of a reflective projection system integrating an IMOD device.

FIG. 17 illustrates a top plan view of a reflective IMOD projection device 240. The device 240 includes a light source 242 configured to propagate light through a polarizer 244 and into a polarizing beam splitter 250. The polarized light enters the polarizing beam splitter 250 and is reflected out of the beam splitter to a ¼ wave plate 248. The polarized light is partially rotated by the ¼ wave plate then strikes and reflects from the IMOD 252. The light passes through the ¼ wave plate a second time and then moves on into the polarizing beam splitter. Having undergone two ¼ wave rotations and a reflection at the IMOD the light passes directly through and out of the beam splitter 250. A lens group including a first lens 246A and a second lens 246B inverts and brings to focus the light exiting the projection device 240.

Figure 18:
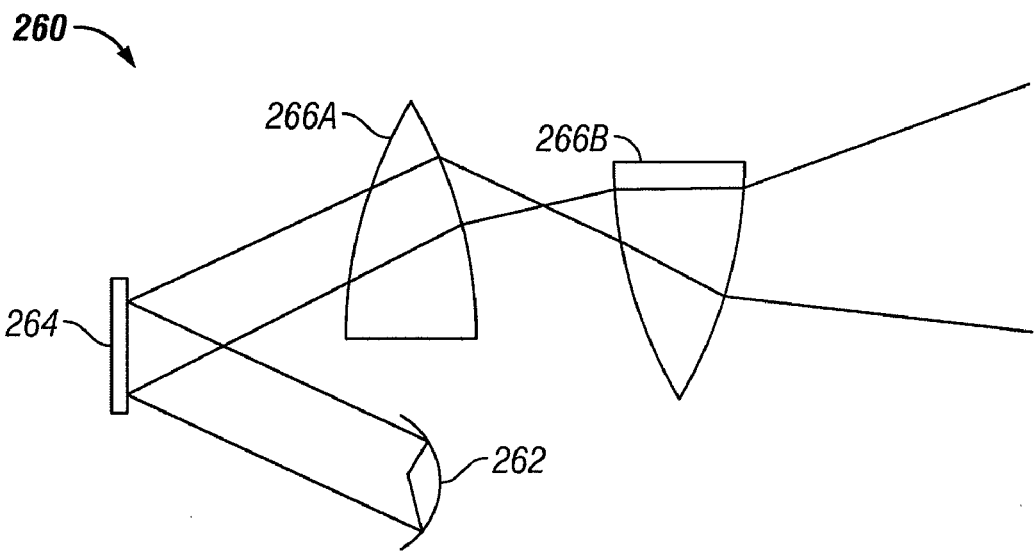
FIG. 18 is a top plan view of a reflective projection system integrating an IMOD device.

FIG. 18 illustrates a side plan view of one embodiment of a rising front IMOD projection device 260. Light is propagated from a light source 262 and reflected off of a reflective IMOD 264 towards a lens group including a first lens 266A and a second lens 266B configured to invert and focus the light as it exits the device 260.

Since the divergence angle of the illumination source can be controlled in a projector (as opposed to the situation in a direct view display illuminated by ambient light) there may be no requirement to affix diffusing films to IMOD displays used for projection. In fact, the color dependence of the IMOD over incident light angle can be exploited in the projection situation. Very narrow beams can lead to highly saturated colors, and broader beams can lead to brighter, less saturated colors. The systems designer can make trade-offs based on this situation. This is a different situation than in current projectors where wider angle beams can also lead to brighter colors albeit at the expense of lower contrast ratios and deteriorating black levels.

Transmissive IMOD displays can be especially effective, since projection systems discriminate against the type of front surface reflections that challenge the design of direct view displays that might utilize transmissive IMOD SLMs.

The low cost of IMOD SLMs fabricated on large sheets of glass offer another design advantage. Not limited by cost to very small sizes (as are the DMD and LCOS devices), larger panels can be used to exploit area-modulation in order to achieve high bit depths beyond the reach of competing technology.

Since the IMOD begins with an optical stack, fabrication economies can be introduced. Most projectors have a cold mirror in the illumination optical system to avoid transferring unnecessary heat to the SLM. In some embodiments the cold mirror may be fabricated as part of the front surface of the IMOD to reduce parts count in the final projector assembly.

In the projection application the IMOD has no significant SLM size restriction. Smaller SLMs usually lead to smaller projection systems, but extreme smallness has no particular advantage in large projection systems. The IMOD SLM can be size adapted to every application. This allows optimal performance in every application.

An IMOD can trade-off color performance without direct and strong impact on contrast ratio performance.

An IMOD has the possibility of both area-array and pulse width modulation. This allows the device to be optimized for both high power and low power application.

Dielectric Interferometric Modulators for Large Screen Displays

Large screen IMOD display devices may be used in connection with television and computer monitors. In some embodiments these devices are connected to mains service (100-110 VAC or greater than 200V—for example, in the United Kingdom or Europe), thus power is of minimal concern relative to the constraints applied to portable, battery-powered devices. In some embodiments the displays may use pulse-width-modulation technique to achieve grey scale. In some embodiments the pulse-width-modulation drive requires short frame time and/or highly conductive row and column traces. In some embodiments the devices are back-lit devices. In some embodiments the devices include transmissive IMODs with multi-layer film stacks.

In some embodiments an IMOD can use two dielectric mirrors (instead of metallic mirrors) to transmit at each pixel a selected color band while reflecting all other wavelengths. An array of these modulator elements can be used with a co-designed backlight to form a transmissive backlit display.

Large, direct-view displays are almost universally self-emissive or backlit. Such displays, especially those designed for television applications, are often viewed in conditions of reduced ambient illumination. This puts reflective displays at a disadvantage in these applications because reflective displays may include frontlights, and frontlight performance suffers when applied to large diagonal screens. There are ways to backlight a reflective IMOD display, but they tend to be inefficient and diminish the perceived performance of the IMOD.

There are various current backlight approaches for reflective IMODs. A first approach involves placing inward facing reflectors on a front surface of the IMOD substrate and illuminating the inward facing reflectors by forcing light from behind a backplate through small apertures around the IMOD pixels. Such light can then be reflected onto the pixels. This approach can probably only illuminate the edge of the pixels. It can be inefficient and lead to a visible "coring" effect.

A second approach involves placing back-facing emitters on the front surface of the IMOD substrate. This can be logistically complex, can hurt the IMOD optical performance, and may still not result in a favorable viewing experience.

There are also methods of using the IMOD structures (such as the support posts) to pipe light form the back to the front of the IMOD, but all such approaches compromise the design.

Figure 20:
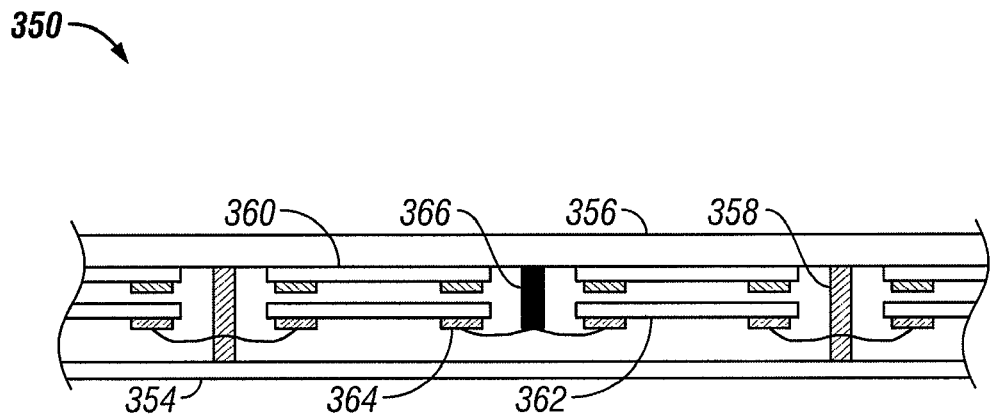
FIG. 20 is a cross-section side view of one embodiment of an interferometric modulator in an architecture similar to those illustrated in FIGS. 7A-7E with a dielectric mirror.

FIG. 20 illustrates a cross section side view of one embodiment of a large screen display 350 including a backside buss 354 and a transparent substrate 356. In some embodiments the transparent substrate 356 comprises glass. As illustrated in FIG. 20 one or more high posts 358 connect the transparent substrate 356 and the backside buss 354. One or more stationary optical stacks 360 are disposed on the transparent substrate 356, between the transparent substrate 356 and the backside buss 354. One or more movable optical stacks 362 are also positioned between the transparent substrate 356 and the backside buss 354. Attachment rings 364 on the one or more movable optical stacks 362 connect to lower posts 366, which are attached to the transparent substrate 356. As shown in FIG. 20 the current reflecting mirror in an architecture similar to those illustrated in FIGS. 7A-7E can be replaced with a dielectric mirror 354. In some embodiments the optical stacks are modified to comprise a single and more complex optical stack. The resultant combination of two optical stacks separated by an air gap can be combined to pass one wavelength band while reflecting all other wavelengths.

The mechanical layer from the architecture similar to those illustrated in FIGS. 7A-7E serves its usual purposes of supporting the mirror and providing a spring restoring force. Also, this layer covers part of the dielectric mirror to form a conductive electrode that can be attracted by a similarly shaped electrode on the substrate. In some embodiments the electrodes are ring-shaped. In other embodiments the electrodes are not ring-shaped.

As in conventional IMODs, the optical stacks (the one or more stationary optical stacks 360 and the one or more movable optical stacks 362) are designed so that as the two dielectric stacks are pulled together the resonant wavelength moves out of the visible spectrum—rendering the mirror black to the viewer's eye. The combination of the one or more stationary optical stacks 360 and the one or more movable optical stacks 362 may create a color resultant from that particular pixel. Both the one or more stationary optical stacks 360 and the one or more movable optical stacks 362 may include clear center apertures with conductive outer rings masking an area around the clear aperture. The outer rings serve as electrodes to pull the movable optical stack 362 close to the stationary optical stack 360 through electrostatic attraction. The backside buss 354 is configured to provide high conductivity. In some embodiments a frontside buss may be included because a significant area is given up to the electrodes, posts, and busses.

Figure 21:
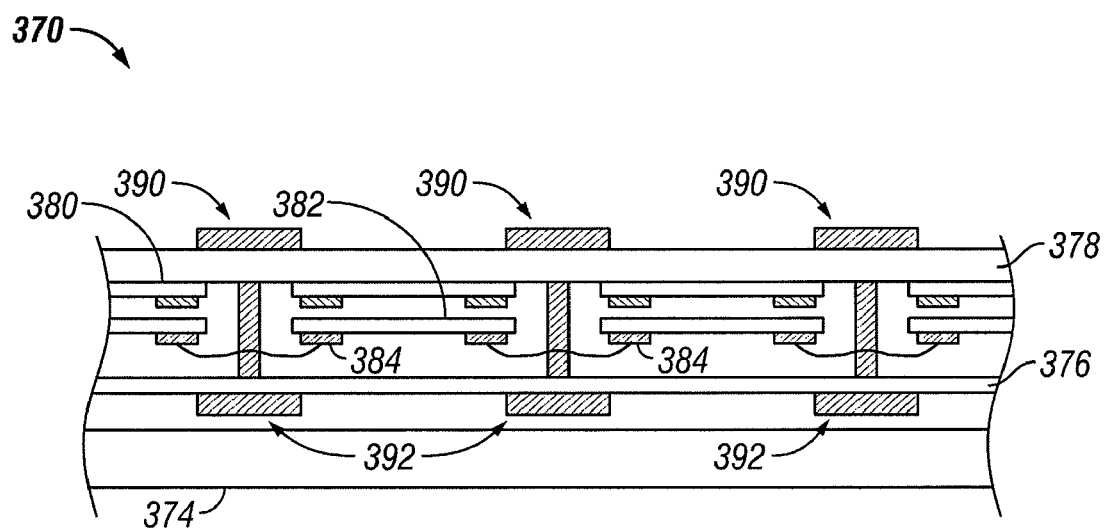
FIG. 21 is a cross-section side view of one embodiment of a display with an absorbing black mask on the front and a reflective black mask on the back.

FIG. 21 illustrates a cross section side view of another embodiment of a large screen display 370. The large screen display 370 includes a backlight 374, a back transparent layer 376 and a front transparent layer 378. In some embodiments the back transparent layer 376 and the front transparent layer 378 comprise glass. One or more stationary optical layers 380 are disposed on the front transparent layer 378. One or more moving optical layers 382 are connected to each other by attachment rings 384. Posts connect the back transparent layer 376 to the front transparent layer 378. In FIG. 21 an absorbing black mask 390 is shown disposed on the front transparent layer 378 to improve contrast ratio, and a reflective black mask 392 is shown disposed on the back transparent layer 376 to keep light entering the back of the IMOD from the backlight from reaching non-active areas of the pixel. The reflective nature of the reflective black mask 392 increases recycling of the light.

In some embodiments the front transparent layer 378 is completely masked off with an absorbing black mask configured to keep spurious light from both entering non-active regions from the front and to prevent light that has entered these regions from exiting to the front. In some embodiments the reflective black mask 392 is configured to assure only light from the backlight enters the active area of the pixels. In some embodiments the backlight 374 is a recycling backlight to compensate for limitations in the percent active area display. In some embodiments the backlight 374 is configured to provide light that does not hit an active area. In some embodiments the backlight 374 is configured to provide light that hits an active area and/or that selects against the wavelength of said light re-enters the backlight and has the chance to be reflected and enter the IMOD for a second time. Eventually, this light has a chance of hitting a proper active area. Such a back light is illustrated in FIG. 22.

Figure 22:
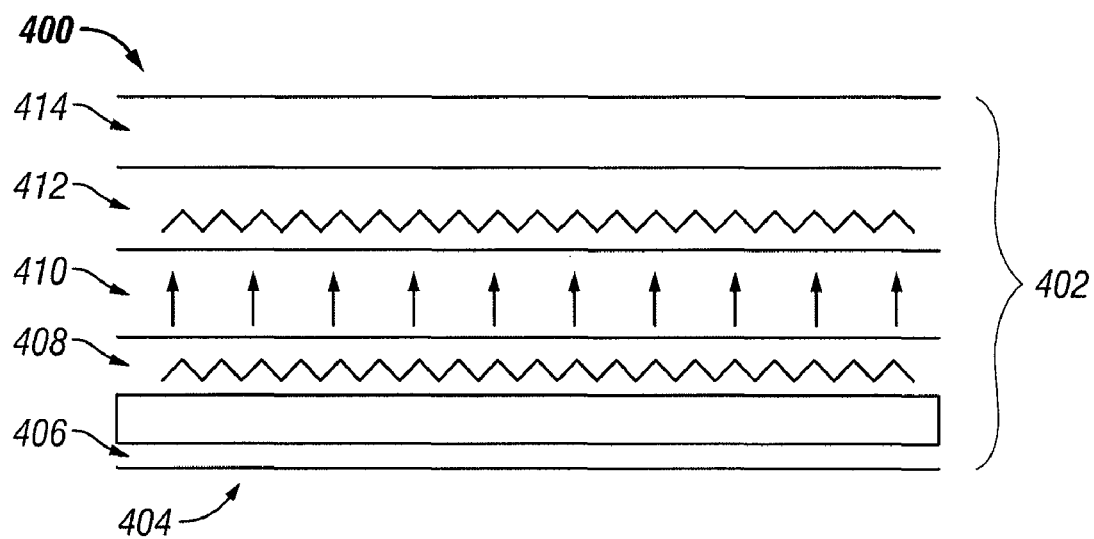
FIG. 22 is a cross-section side view of one embodiment illustrating a backlight including a light-guide plate, an angle turning film, a film to collimate light and help with recycling, and a reflector.

FIG. 22 illustrates a cross-section side view of another embodiment of a large screen display 400 comprising an optical stack 402. The optical stack 402 includes a reflector layer 404, a light guide plate 406 disposed over the reflector layer 404 and an angle turning film 408 disposed over the light guide plate 406. The light guide plate has been designed to emit light from its top surface toward the angle turning film, The reflector layer 404 provides recycling of light that has been reflected from the IMOD 414 and redirection of any light that has been scattered from the top surface of the light guide plate 406 Light passes from the reflector layer 404, through the light guide plate 406 and the angle turning film 408 and then crosses a gap 410 before entering a brightness film 412. The brightness film 412 is configured to collimate light and help with light recycling. Light passing through the brightness film 412 then enters the transmissive IMOD 414 before exiting the large screen display 400.

Figure 23:
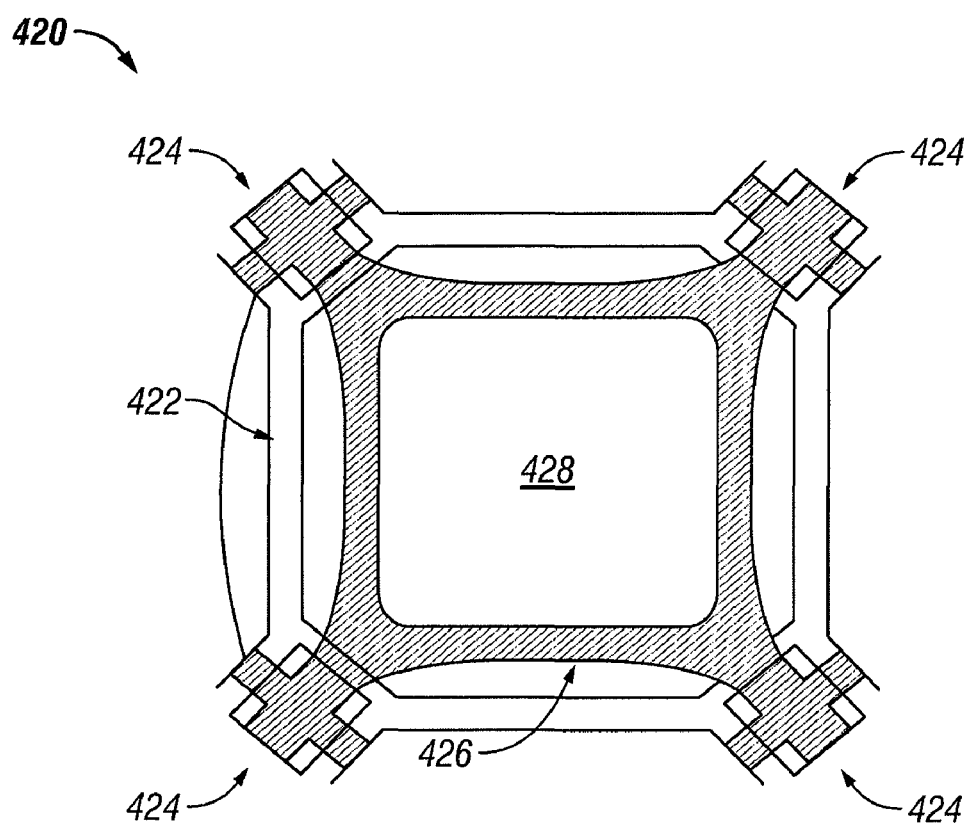
FIG. 23 illustrates a top plan view of a pixel layout.

In FIG. 23 a top plan view of a pixel layout 420 is illustrated in more detail. The pixel layout 420 includes a moving optical stack 422, a plurality of posts 424 and an electrode ring 426. The electrode ring 426 includes an aperture 428 in a center of the electrode ring 426. A flexible mechanical layer connects the moving optical stack 422 to the plurality of posts 424. The mechanical layer is patterned on the back of the moving optical stack 422 to form the electrode ring 426. A similar electrode ring may be patterned on the substrate. In some embodiments dielectric mirrors can be close-packed, the electrode portions can be made as small as possible, and pulse width modulation can be used create grayscale. The high speeds of pulse width modulation may include high conductance row and column traces, so back-side bussing can be used. The backplate can be applied directly to the highest layer of posts used to support the backside buss leads. This leaves a very small inter-substrate gap which allows the structure to be assembled with a reflowed metal edge seal to achieve hermetic packaging.

Due to the "bulls-eye" nature of the pixels it may be desirable to align a lenslet array with the pixels. In this case it could be preferable to make the backplate and the lenslet array integral.

In preferred embodiments a backlit flat panel TV can be fabricated with mostly existing IMOD fabrication methods (which are relatively low in cost). In some embodiments (such as those illustrated in FIGS. 20-23), two dielectric optical stacks may function to pass a preferred wavelength band in the visible spectrum when removed form each other and pass a band or multiple bands in spectral areas outside the visible spectrum when proximate to each other. In some embodiments light that is not passed, rather than being absorbed, is reflected back into the backlight. In some embodiments the backlight is designed to statistically recycle the right for reuse, or it can be explicitly designed to preferably reflect rejected light to neighboring pixels. In some embodiments, instead of using a reflective mask on the back of an IMOD, a microlens array is used to converge incident light into the clear active aperture of the microlens array.

The foregoing description details certain embodiments. However, no matter how detailed the foregoing appears in text, the teachings described herein can be practiced in additional ways. Use of particular terminology when describing certain features or aspects should not be taken to imply that the terminology is being re-defined herein to be restricted to including any specific characteristics of the features or aspects with which that terminology is associated. Further, numerous applications are possible for devices of the present disclosure. It will be appreciated that various modifications and changes may be made without departing from the scope of the invention. Such modifications and changes are intended to fall within the scope of the invention, as defined by the appended claims.

What is claimed is:

1. A device, comprising:
   a movable membrane including a partially reflective mirror;
   a substrate positioned on a first side of the movable membrane; and
   a light source positioned on a second side of the movable membrane and configured to emit light incident on the second side of the movable membrane,
   wherein the movable membrane is configured to move from a first position to a second position,
   wherein with the movable membrane in the first position visible light of a desired wavelength range passes through the movable membrane and through the substrate, and
   wherein with the movable membrane in the second position substantially all of the visible light of the desired wavelength range is blocked.

2. The device of claim 1, wherein with the movable membrane in the second position at least 90% of visible light incident on the second side of the movable membrane is blocked.

3. The device of claim 1, wherein with the movable membrane in the second position the movable membrane defines at least in part an optical interference cavity configured to pass light of desired wavelengths, and wherein the movable membrane includes an absorber layer configured to absorb light of other wavelengths.

4. The device of claim 3, wherein the absorber layer includes a semiconductor.

5. The device of claim 1 further comprising a mechanical layer including a dielectric material.

6. The device of claim 5, wherein the dielectric material comprises at least one of SiN or $SiO_2$.

7. The device of claim 5 further comprising a thin layer of a metal disposed on top of the dielectric material.

8. The device of claim 7, wherein the thin layer of metal comprises at least one of Au or Ag.

9. The device of claim 1, wherein the substrate includes a transparent substrate.

10. The device of claim 1, wherein the partially reflective mirror includes a flexible, silver-coated membrane.

11. The device of claim 1 further comprising a lens configured to focus light passing through the substrate and the movable membrane.

12. A transmissive mechanical device, comprising:
    a first optical stack separated by a gap from a second optical stack;
    a light source positioned on a first side of the first optical stack and configured to emit light through the first optical stack to the second optical stack; and
    a lens configured to focus light exiting the second optical stack,
    wherein the first optical stack includes at least one material with an index of refraction greater than 2 and at least one material with an index of refraction less than 1.3, and
    wherein the second optical stack includes a glass substrate, at least one material with an index of refraction greater than 2 and at least one material with an index of refraction less than 1.3.

13. The transmissive mechanical device of claim 12, wherein within either the first optical stack or the second optical stack a first material having a higher relative index of refraction is positioned so as to sandwich a second material having a lower relative index of refraction.

14. The transmissive mechanical device of claim 13, wherein a difference between the index of refraction of the sandwiching layers and the middle layer is maximized.

15. The transmissive mechanical device of claim 14, wherein at least one layer includes a dielectric.

16. The transmissive mechanical device of claim 14, wherein at least one layer includes a semiconductor.

17. The transmissive mechanical device of claim 14, wherein the thickness of each layer is greater than 25% of the wavelength of light incident on the substrate.

18. A transmissive display, comprising:
    a transparent substrate;
    a first reflecting layer disposed on a first surface of the transparent substrate;
    a movable membrane including a second reflecting layer, wherein the second reflecting layer and the first reflecting layer form a variable optical cavity; and
    a light source, wherein the movable membrane is positioned between the light source and the transparent substrate, and wherein the light source is configured to emit light incident on the movable membrane,
    wherein the variable optical cavity is adjusted as the movable membrane moves from a first position to a second position, and
    wherein when the movable membrane is in the first position, the movable membrane allows transmission of wavelengths in the range of ultraviolet or infrared light, and absorbs substantially the entire wavelength range of incident visible light.

19. The display of claim 18, wherein the first reflecting layer includes a material with an index of refraction greater than 2.0.

20. The display of claim 18, wherein the first reflecting layer comprises at least one of Au, Ag or SiC.

21. The display of claim 18, wherein the entire wavelength of incident light is a particular wavelength.

22. The display of claim 18, wherein when the movable membrane is in the first position at approximately 300 nm a peak transmission is approximately 650 nm.

23. The display of claim 18, wherein when the movable membrane is in the second position a peak transmission is approximately 450 nm.

24. The display of claim 18 further comprising a linear polarizer.

25. The display of claim 18 further comprising an optical isolator.

26. The display of claim 18 further comprising a lens configured to focus light exiting the movable membrane.

27. The display of claim 26, wherein the lens is configured to focus light onto a pixel.

28. The display of claim 26, wherein the lens includes an array of lenses.

* * * * *